United States Patent
Emsters et al.

(10) Patent No.: US 6,302,358 B1
(45) Date of Patent: Oct. 16, 2001

(54) QUICK CHANGE SYSTEM AND METHOD FOR CONVERTING AN AIRCRAFT FROM A CARGO MODE TO A PASSENGER MODE AND VICE VERSA

(75) Inventors: Peter Emsters, Colomiers; Torsten Eilts, Cornebarrieu, both of (FR)

(73) Assignee: Societe Industrielle et Commciale de Materiel Aeronautique (FR)

( * ) Notice: Subject to any disclaimer, the term of this patent is extended or adjusted under 35 U.S.C. 154(b) by 0 days.

(21) Appl. No.: 09/117,458

(22) PCT Filed: Feb. 28, 1997

(86) PCT No.: PCT/EP97/01005

§ 371 Date: May 3, 1999

§ 102(e) Date: May 3, 1999

(87) PCT Pub. No.: WO97/31820

PCT Pub. Date: Sep. 4, 1997

(30) Foreign Application Priority Data

Feb. 28, 1996 (FR) .................................................. 96 02592

(51) Int. Cl.[7] .................................................. B64C 1/22
(52) U.S. Cl. .................................................. 244/137.1
(58) Field of Search ........................... 244/118.1, 118.6, 244/118.5, 137.1; 410/92, 79

(56) References Cited

U.S. PATENT DOCUMENTS

| | | | |
|---|---|---|---|
| 2,558,774 | 7/1951 | Nordquist et al. | 198/33 |
| 2,918,183 | 12/1959 | Petersen et al. | 214/1 |
| 3,026,071 | 3/1962 | Barcellona et al. | 244/137 |
| 3,142,461 | 7/1964 | Naylor | 244/137 |
| 3,294,034 | 12/1966 | Bidenheimer et al. | 105/366 |
| 3,381,921 | 5/1968 | McDonough et al. | 244/118 |
| 3,464,713 | 9/1969 | Davidson | 280/79.1 |
| 3,480,239 | 11/1969 | Jensen et al. | 244/118 |
| 3,486,204 | 12/1969 | Hurtner et al. | 24/201 |
| 3,578,274 | 5/1971 | Ginn et al. | 244/118 |
| 3,899,092 | 8/1975 | Nordstrom | 214/84 |
| 3,912,206 | 10/1975 | Jong | 248/24 |
| 3,982,639 | 9/1976 | Haldimann et al. | 214/16.4 |
| 4,000,870 | 1/1977 | Davies | 244/118 R |
| 4,077,590 | 3/1978 | Shorey | 244/118 R |
| 4,089,399 | 5/1978 | Webb | 193/35 SS |
| 4,147,111 | 4/1979 | Weingarten | 105/463 |
| 4,341,496 | 7/1982 | Carpenter et al. | 410/79 |
| 5,131,606 | 7/1992 | Nordstrom | 244/118.1 |
| 5,383,630 | 1/1995 | Flatten | 244/118.6 |

FOREIGN PATENT DOCUMENTS

| | | | |
|---|---|---|---|
| 858596 | 1/1961 | (GB) | 4/44 |
| 991721 | 5/1965 | (GB) . | |

*Primary Examiner*—Charles T. Jordan
*Assistant Examiner*—Francis T. Palo
(74) *Attorney, Agent, or Firm*—Nawrocki, Rodney & Sivertson, P.A.

(57) ABSTRACT

A system to quickly convert part of the main deck of an aircraft from a passenger transport configuration to a freight transport configuration. The system includes an arrangement to lock at least one seat pallet flush and rigidly secured to the aircraft deck, for the passenger transport configuration, and an arrangement to anchor a cargo loading assembly to the deck, for the freight transport configuration.

26 Claims, 9 Drawing Sheets

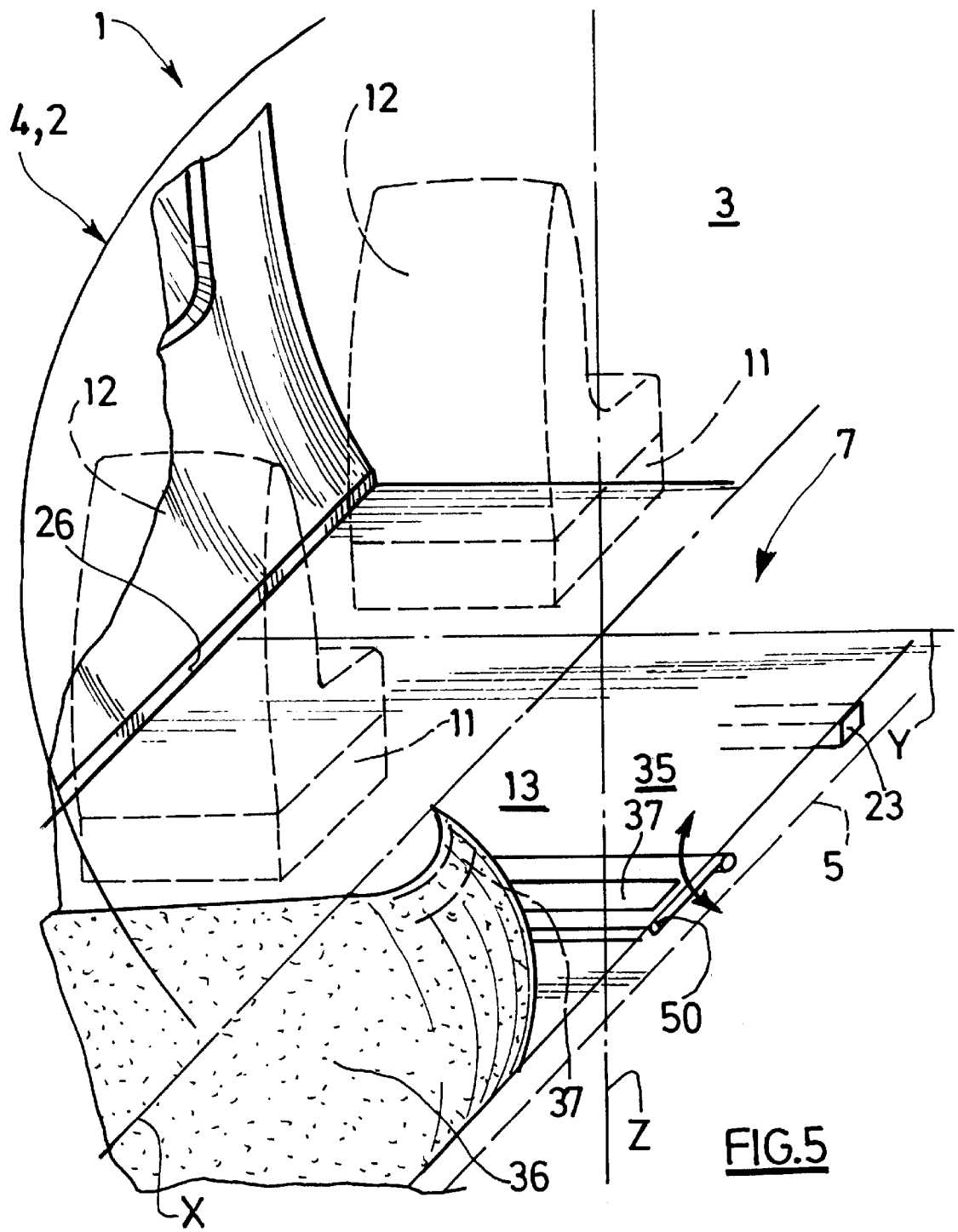

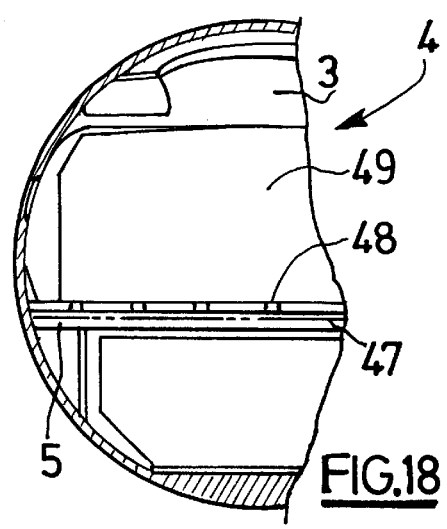
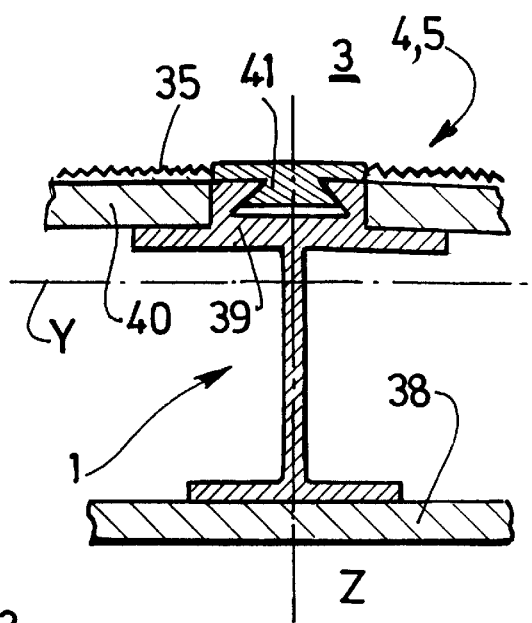
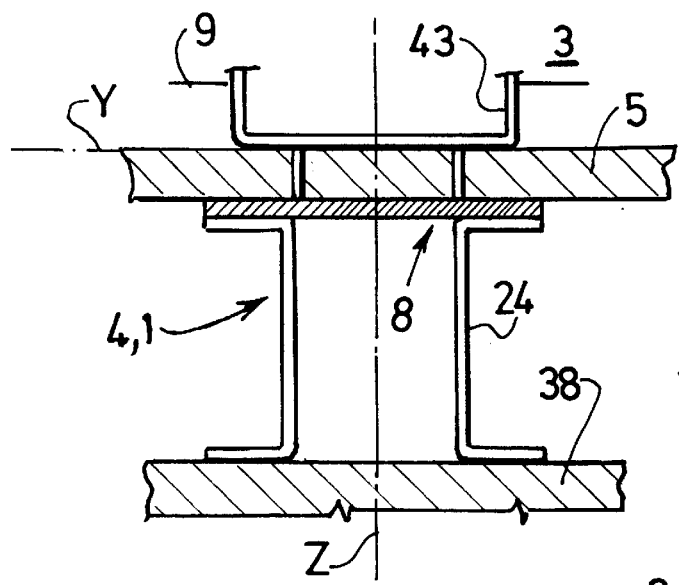
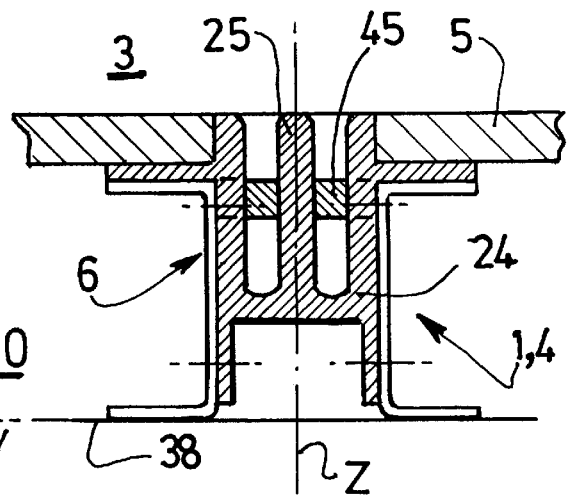

QUICK CHANGE SYSTEM AND METHOD FOR CONVERTING AN AIRCRAFT FROM A CARGO MODE TO A PASSENGER MODE AND VICE VERSA

The invention relates to a system and a method for converting an aircraft, quickly as well as repetetly, from a passenger transport configuration to a freight or cargo transport configuration, and vice versa.

The passenger or "PAX" transport configurations are also called "PAX mode", and the freight transport configurations are also called "CARGO mode".

The general technical field of the invention is the onboard equipment of aircrafts, and specifically of airplanes, such an equipment being fixed in use but mostly removable.

The quick conversion of the invention concerns at least part of the "main" deck of an aircraft, from one of the two mentioned configurations to the other.

Of course, the invention also applies to one or both decks of so-called double-deck or double-body aircrafts.

It also applies to any deck of aircraft, usable for passengers.

Such a conversion makes it possible to provide an aircraft scheduled to perform a specific flight, with a configuration making available a sufficient number of seats for passengers who registered to perform the flight and/or a volume on the same deck or decks, for loading cargo.

Such a conversion allows for either a configuration fully intended for passenger transport, or a configuration exclusively intended for freight transport.

Are also allowed one or more different configurations intended for passenger transport on the one hand, and for freight transport on the other hand.

In this technical field, the following documents are known.

The document GB-A-858.596 relates to apparatus for conveying passengers or freight in a cargo aircraft, so as to avoid that individual pieces of freight or each separate passenger has to be loaded and unloaded individually. Features known by the document GB-A-858.596 are recited in the preamble portion of claim 1.

The floor forms a fixed built-in part of the aircraft structure, and carries directly thereon a plurality of spaced apart parallel tracks adapted to support correspondingly spaced wheels of substantially flat load carrying platforms.

The conventional fixed floor of the load carrying compartment is omitted. In place, each track consist of an elongated member of channel-shape in cross-section. The tracks are placed directly over longitudinal bearers and transverse bearers at crossing points.

Some figures shows a seat platform with an upper metal sheet, a lower metal sheet and a cellular honeycomb intermediate sheet arranged midway therebetween.

In the lower and intermediate sheets only are elongated recesses with flanged inverted channels for support of axle-pins of the rollers.

The platforms extend between opposite lateral sides of the aircraft compartment and engage with means at the sides of the compartment for location against upward movement.

The platforms are provided with a number of seats mounted thereon, via detachably fastening means. This means comprises ring fitting consisting of a dished plate, let into a recess in the upper surface of the floor.

A U-shaped ring and springs are normally accomodated in the cavity. The lower ends of the springs are resting on the base of a box in the platform.

The document GB-A-991.721 also relates to improvements to apparatus for conveying passengers or freight in a cargo aircraft.

A removable passenger-seating unit comprise a pallet bearing a number of seats, in an arrangement such that the pallets can be run in, on rollers, over the floor of the freight compartment. The seats are fixed on a substantially flat-topped pallet.

The pallets constitute false floor sections and are provided with individual side wall panels. Ceiling panels may also be provided for.

Document U.S. Pat. No. 2,558,774 describes a system for loading or unloading a freight transport aircraft, including a roller slide and portable and dismountable pallets.

Document U.S. Pat. No. 2,918,183 (U.S. Pat. No. RE 25,045) describes a system for handling freight on air bearings.

Document U.S. Pat. No. 3,026,071 describes a container for loading light packages, allowing for semi-automatic loading or unloading.

Document U.S. Pat. No. 3,142,461 describes an internal arrangement of an aircraft, whose purpose is to adapt the interior of an aircraft for freight transport or passenger transport according to occasional requirements.

Document U.S. Pat. No. 3,294,034 describes a freight loading container for aircraft.

Document U.S. Pat. No. 3,381,921 describes a system for quickly converting an aircraft from a passenger transport configuration to a freight transport configuration, and vice versa.

It includes rail assemblies permanently installed lengthwise in the floor of an aircraft and conveying rollers for pallets, freight pallets locks retractable into the floor, as well as seat pallets with latches mounted therein for gripping the rails of the conveyor system to hold the pallets in place.

Document U.S. Pat. No. 3,464,713 describes a trolley with a notched segmental profile.

Document U.S. Pat. No. 3,480,239 describes a quick loading system, with tracks mounted on the floor structure.

Document U.S. Pat. No. 3,486,204 describes a seat support pallet locking device.

Document U.S. Pat. No. 3,578,274 describes a pallet assembly of the type having moveable side parts, the assembly comprising locking devices whose structural components are fixed to the body of the pallet and to the side laps of the latter, respectively.

Document U.S. Pat. No. 3,899,092 describes freight transport structure modules.

Document U.S. Pat. No. 3,912,206 describes load displaying and lifting blocks capable of bearing loads. The blocks can be used as a replacement for modular units such as those which are used to convert aircraft from a passenger transport configuration to a freight transport configuration.

Document U.S. Pat. No. 3,982,639 describes a system equipped with a frame on which wheels are arranged with their axis of rotation above the frame and able to bear loads.

Document U.S. Pat. No. 4,000,870 describes a modular conversion system including floor boards.

Document U.S. Pat. No. 4,077,590 describes a built-in freight handling system wherein displacing or locking members are permanently fixed to the floor or deck of the aircraft.

Document U.S. Pat. No. 4,089,399 describes a mechanical handling apparatus equipped with rollers.

Document U.S. Pat. No. 4,147,111 describes a freight transport pallet whose purpose is to feed the loads to rolling members permanently fixed on the top face of a deck, in an aircraft for instance.

Document U.S. Pat. No. 4,341,496 describes improved seat pallet lock for use with aircraft passenger seat pallets to retain such pallets in operational position in the aircraft.

The seat pallets locks carried by the seat pallets are cooperable with rollers within the roller tray. The lock structure does not require special tracks and may be readily engaged and disengaged manually, without the necessity of tools.

This structure when in the engaged position, is flush with the passenger floor and has no portions thereof protuding upwardly therefrom.

Document U.S. Pat. No. 5,131,066 generally describes a seat pallet and cargo pallet restraining system, which includes a floor mounted rail with attached pallets rollers and cargo locks assemblies. It includes a compact seat pallet latch for engaging the rail.

This system accomodates various size cargo and seat pallets. The floor structure includes an elongated channel with axial spaced lips periodically narrowing the channel. The top of the channel has left and right facing teeth for engaging a seat pallet latch.

Rollers connected to the rail define a roller plane above the rail for supporting a pallet. The latch assembly includes a pair of rotatable jaws that, in a stowed position, are within the pallet and above the roller plane.

The cargo pallet restaining assemblies include a plurality of housings connected to opposite sides of the rail, with aft facing lock heads movable between a stowed position beneath the roller plane and an erect position wherein a lip portion extends above this plane. Preferably, the fore and aft heads are linked for simultaneous movement to a position.

Document U.S. Pat. No. 5,383,630 describes an assembly for rapidly converting the payload-bearing deck of an aircraft, with passenger seats being disposed on pallets.

Connectors pass through the pallet and connect the passenger seat directly to the aircraft main deck to transfer the seat loads.

The teachings of these documents are incorporated herein.

The main drawbacks and disadvantages of the prior art arrangements are now explained.

The prior art conversion systems such as those mentioned above, when installed in an aircraft, include bulk load displacing and locking means permanently installed on the top face of the main deck.

In a passenger transport configuration, rigid boards forming the floor with passenger seats mounted thereon, are arranged in the cabin using displacing and attached to locking means attached to the deck.

In use, rigid boards and pallets, locally supported remote to the deck by the load displaying and locking means permanently installed, withstand loading stresses including bending and torsion.

The term "rigid" indicates that the boards are designed to withstand stresses when, generally remote from the floor, loaded and supported locally upon balls—e.g. i so-called "ball units"—wheels or rollers.

In freight transport configuration, unit load devices or "ULD" are loaded onto the deck, using the displacing and locking means permanently installed.

The height of the seat support boards is in the order of 30 mm. While the height of the displacing means of the cargo loading system is generally of about 50 mm.

These values add up, in passenger configuration, and lead to a loss of height in the cabin of about 80 mm.

In addition, the weight of the above cargo loading system or "CLS", often up to 800 kg, is lost from the available pay-load, even in passenger configuration.

I.e. a dead load unusable for commercial purposes anymore, in passenger configuration, is added by the above bulk systems installed in the cabin on a permanent basis.

With rigid seat support boards mounted on displacing and locking means, the dead load is often in the order of an additional 550 kg in passenger configuration.

Besides, as a result of the increased cabin floor level, seats in front of emergency exits would protude into the minimum required escape pathway or opening. These seats therefore have to be removed in PAX mode.

Similarly, the aircraft in PAX mode should strictly cope with the major safety requirements, such as so-called "16 G tests".

The requirements of cost-effectiveness for airlines, should stimulate the use of an increasing number of convertible aircrafts, allowing to adapt their fleet to the varying demands of the market at a lower cost.

The permanent installation of displacing and locking means, the significance and drawbacks of the adaptations which are usually required, and the aforementioned loss of pay-load and volume, result in that prior conversion systems are mostly mounted in aircrafts at the end of their lives.

The purpose of this invention is to eliminate these disadvantages, notatably.

Also, the invention should allow for a convertion or turn-over time acceptable from the cost-effectiveness standpoint.

For this purpose, a first object of the invention is a system for quickly and repetetly converting at least part of a passenger cabin deck of an aircraft, e.g. an airplane, from one of at least two configurations to the other, i.e. a passenger transport configuration and a freight transport configuration, and vice versa.

This system includes, in combination:
  static locking means for locking at least one seat pallet in a passenger transport configuration, the static locking means being constantly flush with and rigidly secured to the deck;
  static anchoring means for anchoring at least one cargo loading assembly in a freight transport configuration, distinct from or at least partly common with the static locking means, the static anchoring means being constantly flush with and rigidly secured to the deck;
  static securing means for anchoring at least one module unit in a modular transport configuration, distinct from or at least partly common with the static locking and/or anchoring means, the static securing means being constantly flush with and rigidly secured to the deck;
  the static locking means being respectively intended to be interlocked with movable locking elements attached to at least a seat pallet; and displacement means, such as retractable ball bearing elements, are attached on at least one seat rigid underframe of the pallet, on which a non-bearing floor board is rigidly secured;
  the static anchoring means are intended to be interlocked with movable anchoring elements of at least a cargo loading assembly; lower displacement means, such as retractable ball bearing elements being attached to the cargo loading assembly, for transportation of the latter on the deck, while upper displacement means, such as retractable ball bearing elements are attached to the cargo loading assembly, for transportation of at least one unit load device on a top loading face of the assembly; and
  the static securing means are intended to be interlocked with movable securing elements of at least a module unit e.g. for medical, military, laboratory, leisure, equipment purpose; displacement means, such as retractable ball bearing elements being attached to the module unit, for transportation of the latter on the deck.

At least one seat pallet and/or cargo loading assembly and/or module unit is equipped with at least one longitudinal and/or lateral guide, comprising low friction contact means, for instance spring loaded ball bearing elements mounted on an underframe of the pallet, assembly or unit, and projecting from the latter.

According to a feature, the system includes on each lateral side of the cabin, at least two longitudinal guides rigidly attached to the airplane and intended to enable the lateral guidance and positioning of at least one cargo loading assembly and/or seat pallet and/or module unit, e.g. via an underframe.

According to a feature, the system includes at least one positioning cavity, such as a shallow groove, opening flush with the deck and intended to position a cargo loading assembly and/or a seat pallet and/or module unit in a predetermined location, by engaging at least one of the displacement means into the cavity.

A feature provides for at least one of the static locking and/or static anchoring and/or static securing means arranged in the rigidly secured to a floor structure beam.

In one embodiment, at least one of the static locking and/or static anchoring and/or static securing means, includes a female piece secured to a floor structure beam, and at least one male piece hold by this female piece, both being of complementary shape to the corresponding movable locking and/or anchoring and/or securing elements.

For instance, at least a "C-opposed-C" shaped cross section floor structure beam has attached to a female fitting of generally "W" shaped cross section, holding two transverse parallel male bolts.

According to another feature, a mobile generally longitudinally oriented masking and isolating partition is mounted on the aircraft structure, parallel to an inner cabin contour, such that it may be arranged between a loading door of the aircraft and the interior of the cabin.

According to yet another feature, a transverse barrier assembly, e.g. a wall and/or a net, is mounted in a removable manner, near a longitudinal end of a seat pallet and/or a cargo loading assembly and/or a module unit, generally at a foreward end.

In at least a seat pallet and/or cargo loading assembly and/or module unit, the displacement means are retractable and include each a spring rigidly fixed to an underframe of the pallet, assembly or unit on the one hand, on the other hand the spring being adapted to push a rolling member, the latter being rotatably guided in the underframe and pushed so as to generally protude from the underface of an underframe of the pallet, assembly or unit.

For instance, the rolling member is a ball.

According to a feature, at least one module unit is comprised of a rigid underframe and upon the latter, a utility volume e.g. at least partly closed by one or a plurality of walls, generally extending from an upper face of the underframe, this utility volume being dedicated e.g. for medical, military, laboratory, leisure or equipment purpose.

According to another feature, at least one seat pallet and/or cargo loading assembly and/or module unit has attached to pulling down means, for conjuring away displacement means of a retractable type and laying down the pallet, assembly or unit against the deck.

The invention also features that at least one of the movable locking and/or the movable anchoring and/or movable securing means is, at least partly, common with the pulling down means.

According to an embodiment, at least one of the movable locking and/or movable anchoring and/or movable securing means and/or the pulling down means includes at least a control lever and a hook mounted in a mobile fashion an underframe of a seat pallet, cargo loading assembly or module unit.

For instance, the control lever and the hook are connected, e.g. by a hinge, in such a manner that when the level is moved in one direction, the hook projects beneath the seat pallet, cargo loading assembly or module unit and interlocks with static locking and/or anchoring and/or securing means.

Whereas in the other direction, the hook is retracted flush with the bottom of the pallet, assembly or unit, at a distance from the top of the deck.

At least two movable locking and/or movable anchoring and/or movable securing elements and/or pulling down means are connected to a common control, e.g. a plurality of hooks are articulated to a single lever by a rod, so as to be jointly actuated or desactivated.

For instance, all the hooks in a seat pallet and/or cargo loading assembly and/or module unit are connected to the same control lever.

According to a feature, at least one of the movable locking and/or movable anchoring and/or movable securing means and/or the pulling down means, comprises a power control, e.g. with pressurized fluid.

For instance, all the movable locking and/or movable anchoring and/or movable securing elements and/or the pulling down means disposed on a deck, are functionally connected to a pressure fluid source in the aircraft, via the power control.

According to yet another feature, at least one seat pallet and/or cargo loading assembly and/or module unit is equipped with at least one stiffening flap, articulated to a corresponding underframe, so as to overlap at least a neighbouring seat pallet and/or cargo loading assembly and/or module unit.

For instance, a stiffening flap comprises means for interlocking a neighbouring seat pallet and/or cargo loading assembly and/or module unit.

A feature provides for at least a seat pallet and/or cargo loading assembly and/or module unit includes a structure made of a composite material, for instance a honeycomb and/or sandwiched lightweight high resistance material, such as a fiber/metal laminate material.

According to a feature, the system comprises at least a latching element adapted to lock in a predetermined position at least a unit load device, attached to a cargo loading assembly and/or to the structure of the aircraft.

In an embodiment, at least an unit load device latching element attached to a cargo loading assembly is of a retractable type, adapted to be flush with both an upper and a lower level of the assembly when in a retracted state, and/or at least an unit load device latching element attached to the structure of the aircraft is of a retractable type, adapted to be flush with an upper level of the deck when in a retracted state.

According to another feature, the system comprises at least a power drive mechanism adapted to provide for power assisted transportation of at least a unit load device, attached to a cargo loading assembly and/or to the structure of the aircraft.

In an embodiment of at least an unit load device, a power drive mechanism attached to a cargo loading assembly is of a retractable type, adapted to be flush with both an upper and a lower level of the assembly when in a retracted state, and/or at least a power drive mechanism attached to the structure of the aircraft is of a retractable type, adapted to be flush with an upper level of the deck when in a retracted state.

According to a further feature, at least a cargo loading assembly comprises a surrounding underframe and attached to the latter, at least a longitudinal member holding upper displacement means for unit load device transportation and/or latching means for unit load device latching and/or power drive mechanism for power assisted unit load device transportation.

A second object of the invention is a method for quickly and repetetelly converting at least part of a passenger cabin of an aircraft from one of at least two configurations to the other, and vice versa.

According to this method, when converting the aircraft to cargo mode, at least a cargo loading assembly is introduced and installed in the cabin.

And when the aircraft is converted from cargo mode to PAX mode, at least one cargo loading assembly is unlatched and removed from the cabin.

In an example of the method, at least a part of the deck is converted from PAX and/or cargo mode, to a modular mode, through a step of introducing in the cabin, upon his own lower displacement means, a module unit.

Another example provides for that a plurality of seat pallet and/or cargo loading assembly and/or module unit are actuated/desactivated by use of a common control.

A third object of the invention is an aircraft including at least one system and/or converted according to the method as explained above.

The aircraft according to the invention comprises, on the deck 5, only static locking and/or static anchoring and/or static securing means, which are, in at least a retracted state, flush with the deck 5.

Further features and advantages of the invention will be understood upon reading the following detailed description of the embodiments provided as an example and illustrated in the attached drawings.

In the drawings,

FIG. 5 is a view similar to FIGS. 1 and 2, illustrating a passenger transport configuration, and showing seat pallets including a floor pannel with a carpet, which can be anchored continuously to the carpet of another seat pallet.

FIG. 8 is a schematic transverse sectional view of a conventional aircraft cabin, showing a floor beam, a seat rail section, a floor pannel, a carpet with a covering rigid plate.

FIG. 9 is a schematic sectional view across a convertible aircraft cabin, showing a transverse or cross beam, a longitudinal floor beam replacing the conventional seat track, with a "C-opposed-C" shaped cross section, a floor pannel, a roller track section i.e. movable means for a freight transport configuration.

FIG. 10 is a view similar to FIG. 9, showing a fitting acting as movable locking/anchoring/securing means for passenger/cargo/modular transport configuration, attached to a longitudinal floor beam and having at least one female locking piece, holding a male piece, i.e. a pair of bolts, to restrain either a seat pallet in PAX mode and/or a cargo loding pallet (i.e. the componant carrier) in freight mode and/or a module unit in modular mode.

Figure 11:
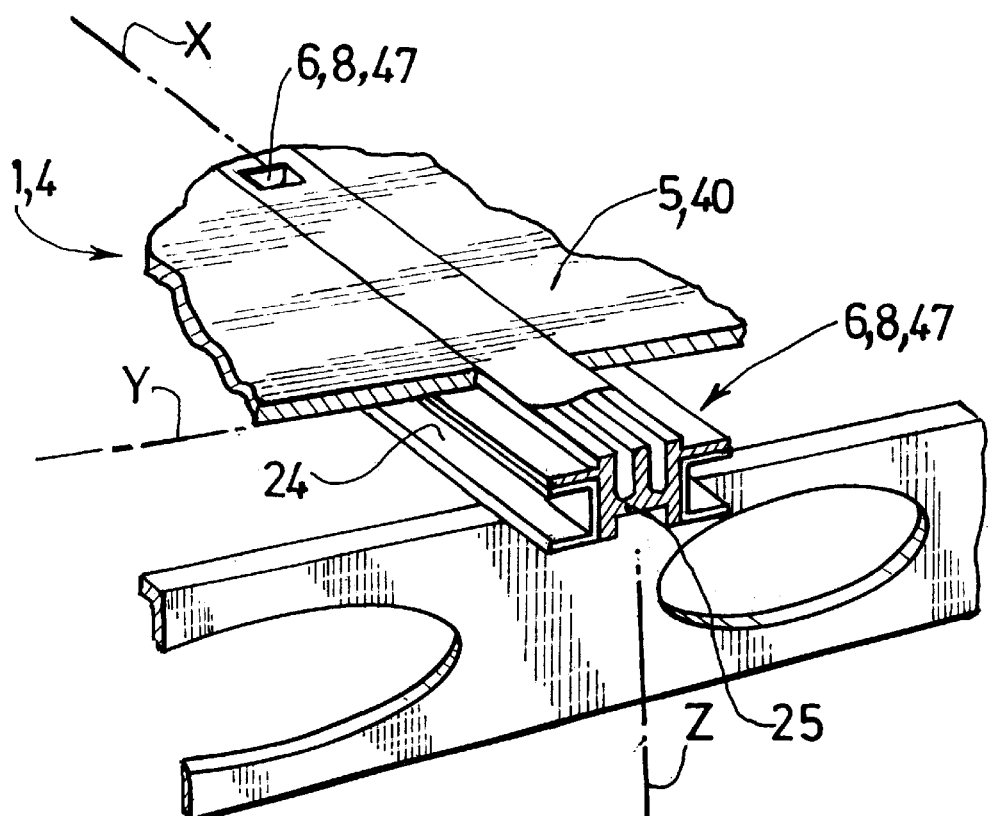

FIG. 11 is a schematic perspective part view of a floor structure according to the invention, including a cross beam, a longitudinal beam, floor pannels and a fitting with static locking/anchoring/securing means.

Figure 12:
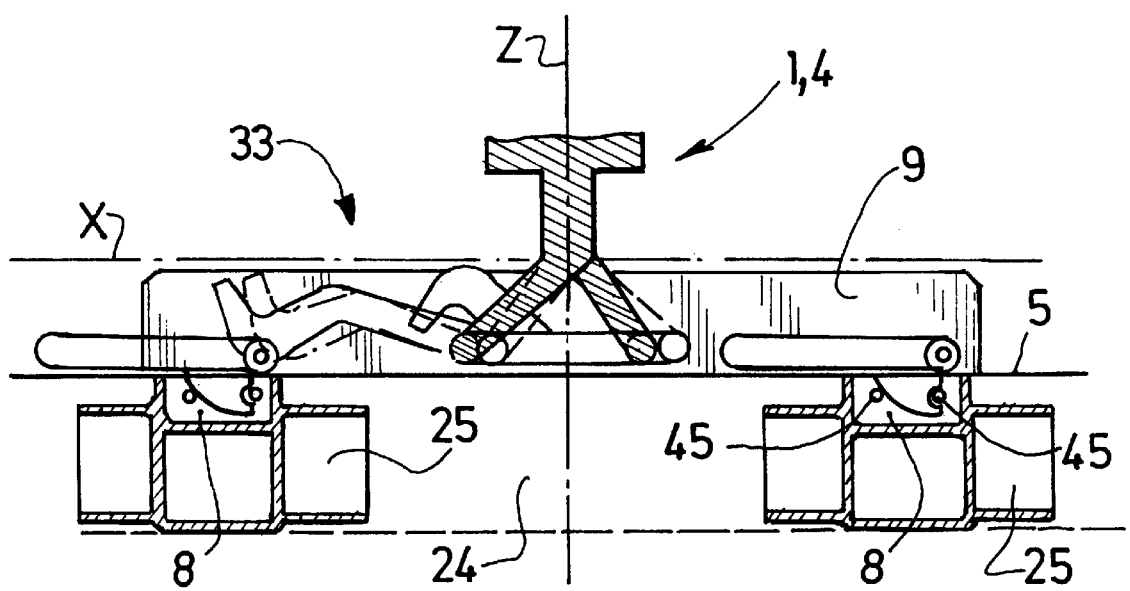

FIG. 12 is a longitudinal cross section part view of retractable latching elements for unit load devices, in an upwardly extended (spangled) and retracted (blanc) states, attached to a cargo loading assembly, in a ready position with its movable anchoring means attached to the static anchoring means of the deck.

Figure 13:
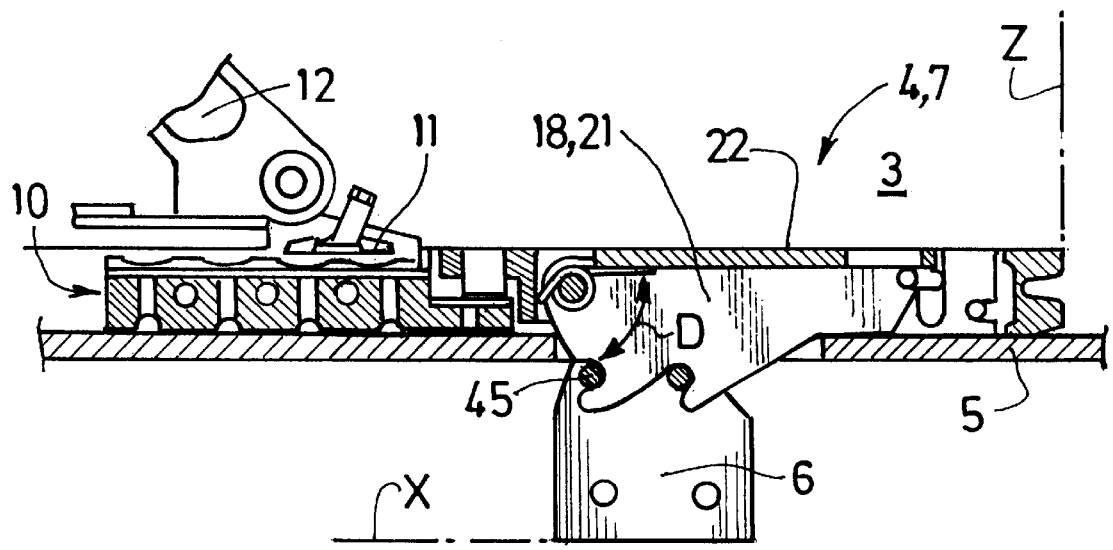

FIG. 13 is an longitudinal cross section part view of a seat pallet with movable locking means on an underframe and static locking means in the floor structure of an aircraft, in a locked and pulled-down position, as per the invention.

Figure 14:
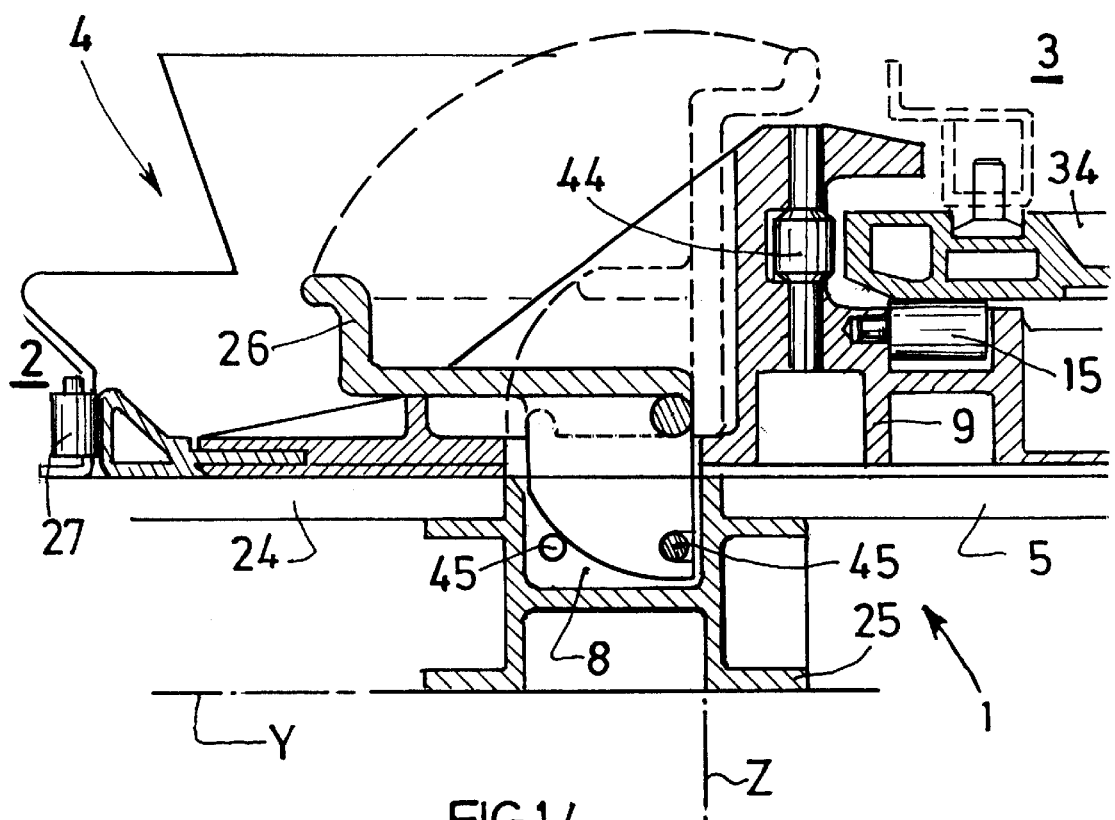

FIG. 14 is an transverse cross section part view of a cabin equipped with low friction contact means, and a cargo loading assembly including movable anchoring elements and a side longitudinal guide with low friction contact means, upper displacement means, while is also partly shown a base plate or underframe and an upright wall of a unit load device.

Figure 15:
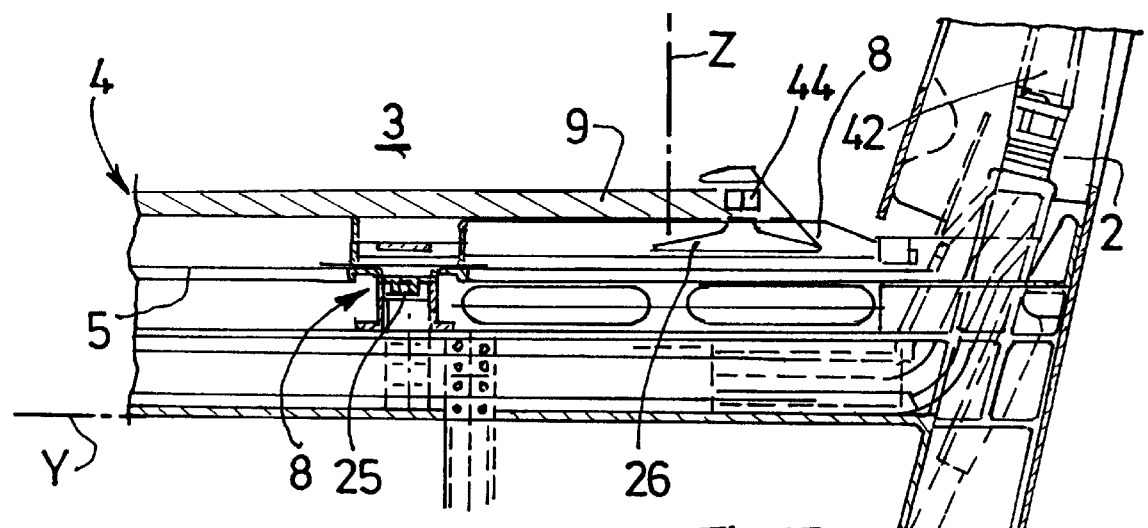

FIG. 15 is a transverse cross section part view of a convertible aircraft in cargo mode.

Figure 16:
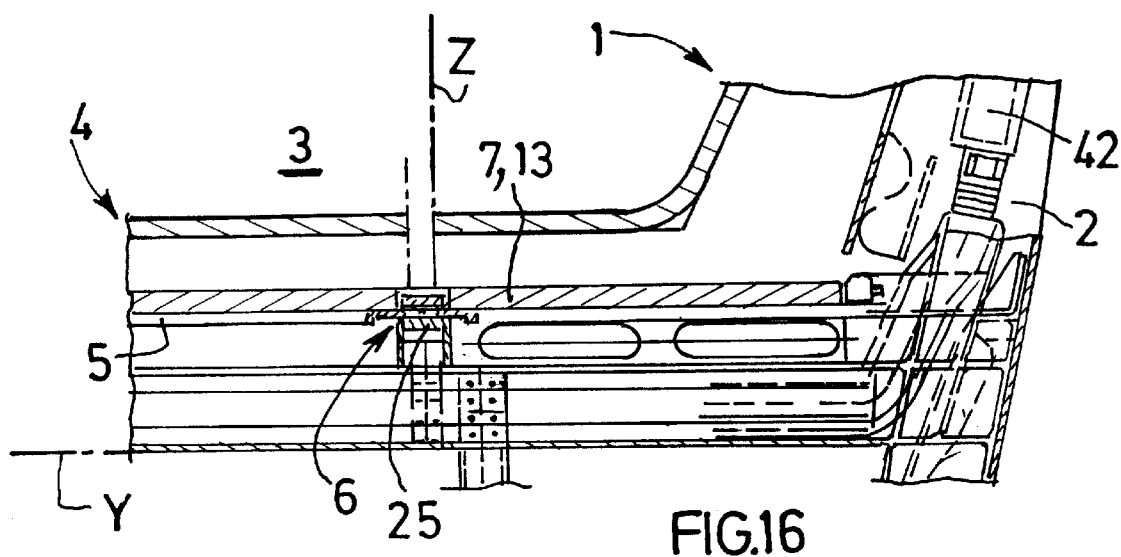

FIG. 16 is a transverse cross section part view of a convertible aircraft in passengers or PAX mode.

Figure 17:
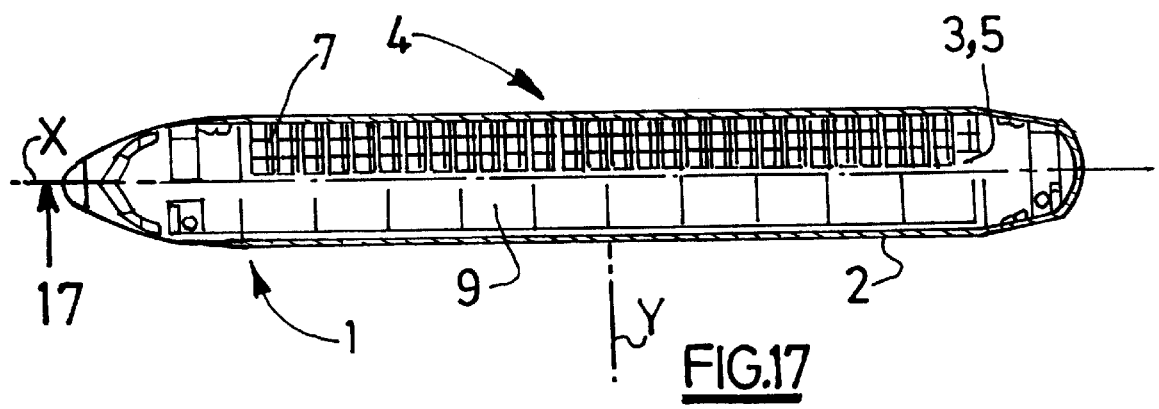

FIG. 17 is a part plan view of the fuselage of a convertible aircraft according to the invention, showing above a line XVII an arrangement of seat pallets (full PAX mode), and below the line XVII an arrangement of cargo loading assemblies (full cargo mode).

And FIG. 18 is a transverse cross section part view of an aircraft according to the invention, shown in cabin modular mode with the movable securing elements and static securing means attached together, so as to maintain a module unit in a predetermined position on the main deck.

In the figures, reference number 1 indicates an aircraft, in this case an airplane liner. An output contour corresponding to the fuselage of the airplane 1 is illustrated by a dotted line indicated by reference numeral 2.

The aircraft or airplane 1 comprises a cabin 3, within the fuselage.

For instance FIGS. 1 to 6 show a direction X referred to as longitudinal. It corresponds to the direction of flight of the airplane 1. The terms "fore" or "forewards" and "aft" are defined along this direction.

As in FIGS. 1 to 3, 5, and 8 to 10, a direction Y referred to as transversal is perpendicular to direction X. The terms "lateral" and "side" refer to this direction.

As in FIGS. 1, 2 and 4 to 10, a direction Z referred to as elevation direction is perpendicular to directions X and Y.

The elevation direction is considered as being vertical, in this example. The terms "high", "low", "top", "bottom", "up" and "down" are defined along this direction.

Directions X and Y define a plane XY referred to as horizontal, since for the purpose of the specification the direction Z is considered as vertical.

Of course, the aircraft 1 can adopt various orientations in space, and therefore directions X, Y and Z only represent an example allowing for a simple specification.

In the figures, a system 4 makes it possible to quickly and repetetelly convert at least part of the main deck 5 of the aircraft 1 from one configuration to an other.

Figure 6A:
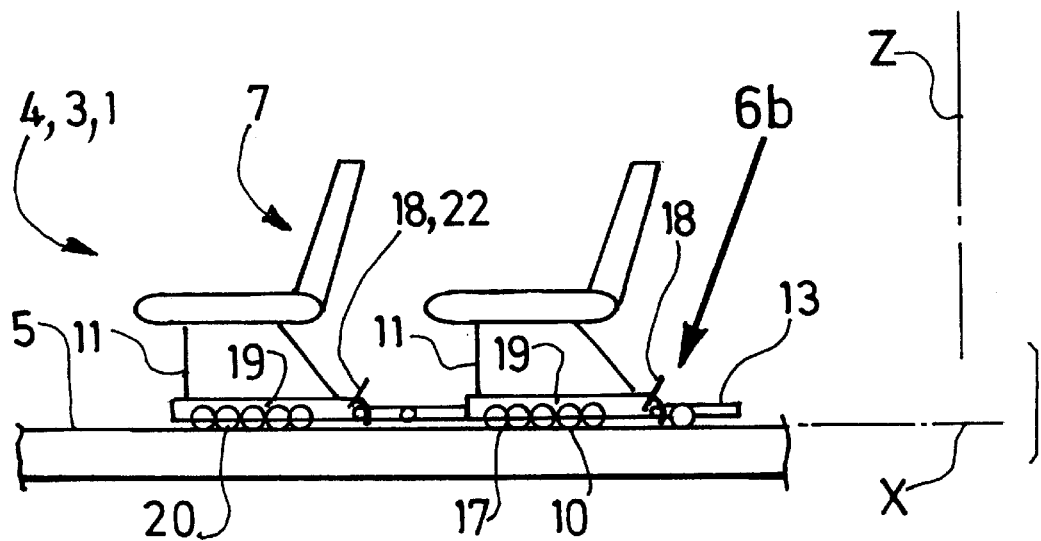
FIG. 6a is a schematic side view of a seat pallet for a passenger transport configuration, in a non-locked and non-pulled-down state.
Figure 6B:
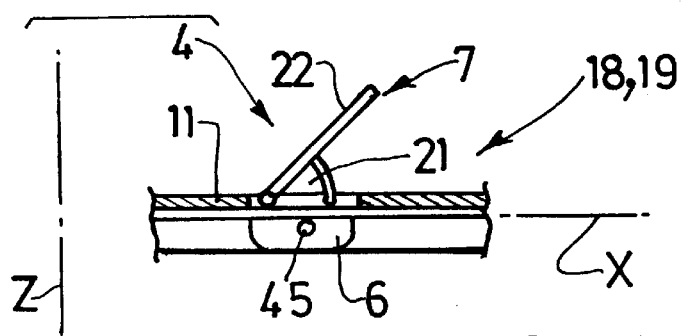
FIG. 6b is an enlarged schematic view of a detail designated in IV on FIG. 6a, showing a control lever and a locking hook mounted on an underframe of the seat pallet, according to the invention.
Figure 7:
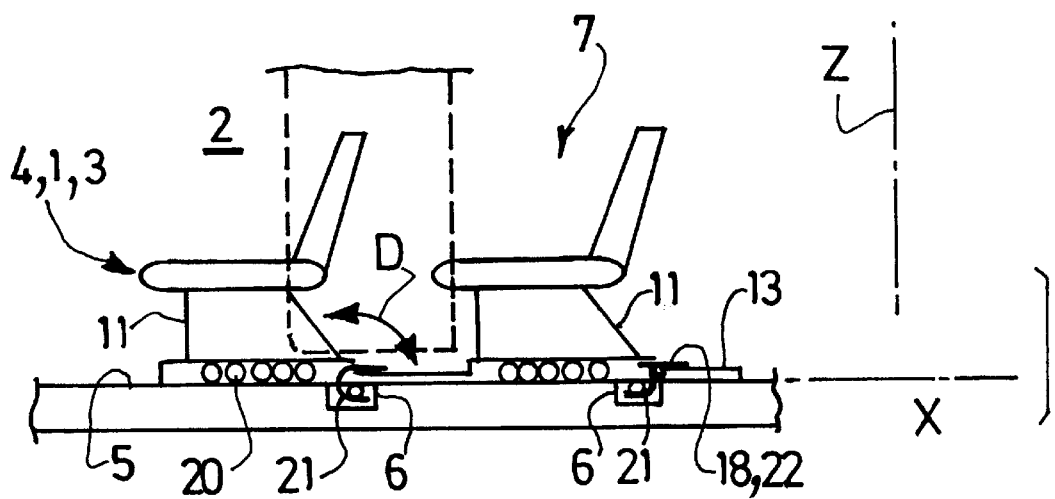
FIG. 7 is a schematic side view of the seat pallet of FIG. 6a or 6b, in a locked and flattened-down state.

A configuration or mode, referred to as passenger transport or PAX, is illustrated in FIGS. 5 to 7.

Figure 2:
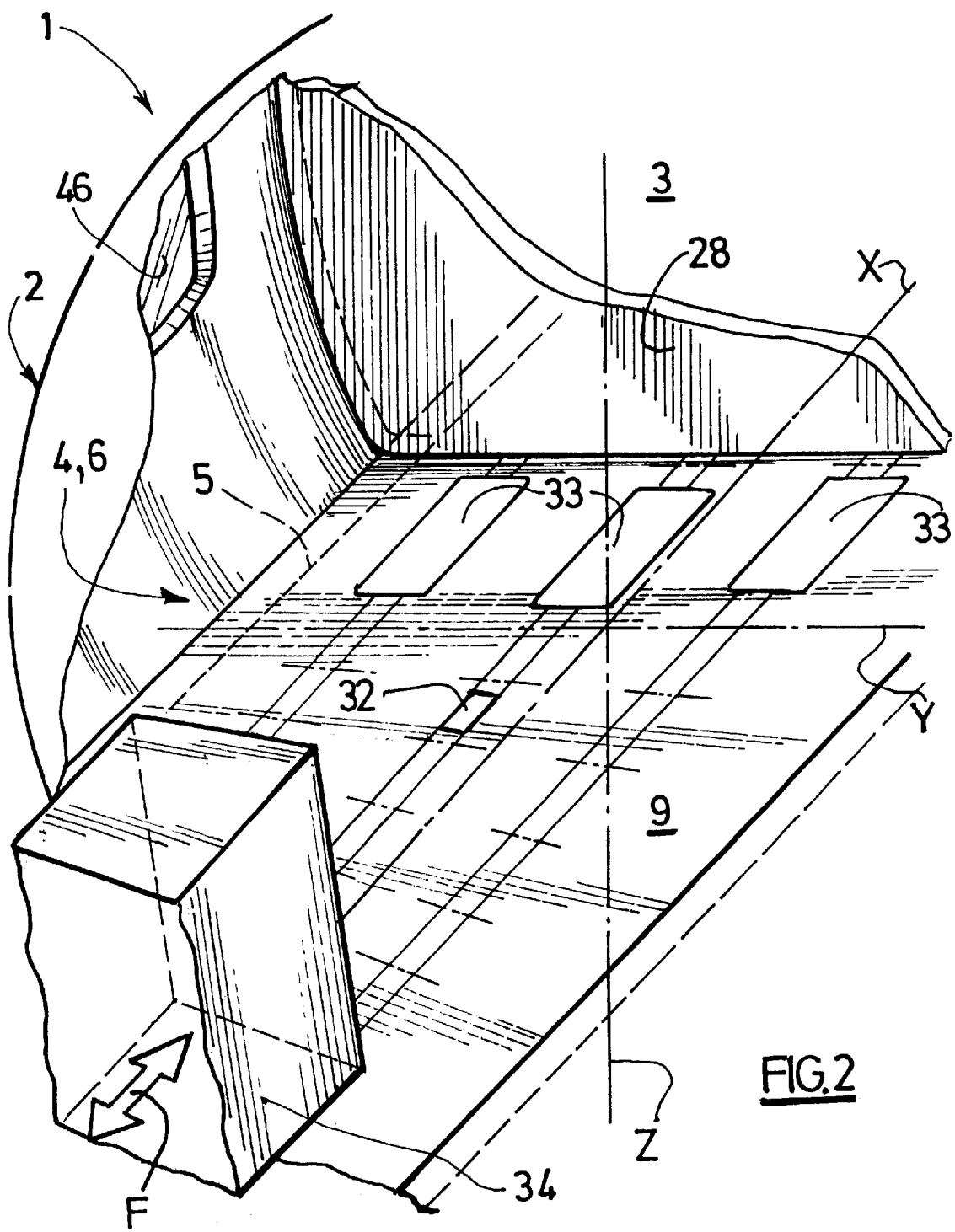
FIG. 2 is a schematic perspective view of a convertible aircraft cabin, in freight transport configuration, equipped with cargo loading assemblies and a transverse barrier assembly or wall for separating the cabin into distinct areas.
Figure 3:
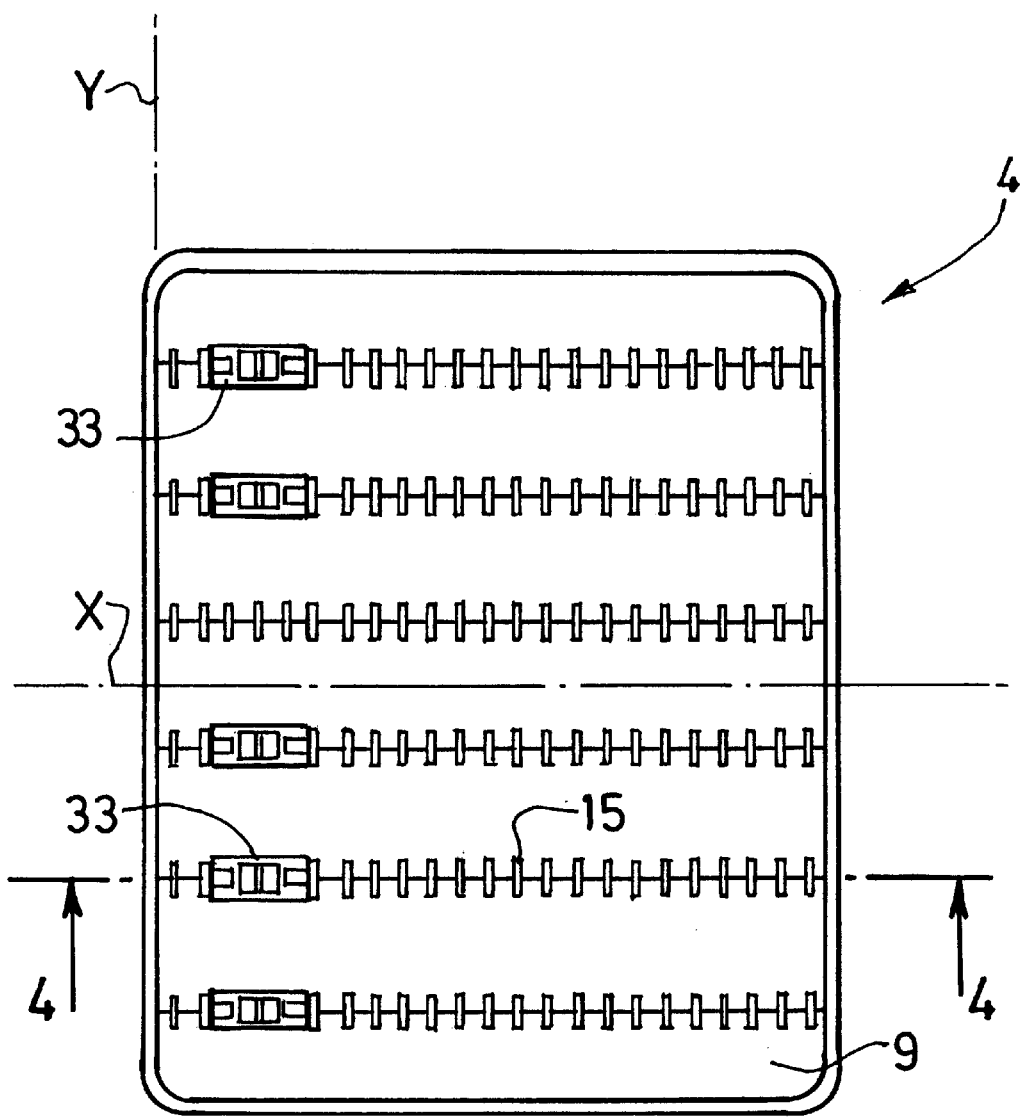
FIG. 3 is a schematic top view of a cargo loading assembly for a freight transport configuration, equipped with upper displacement means and latching elements for unit load devices, i.e. freight loading containers in this example.
Figure 4:
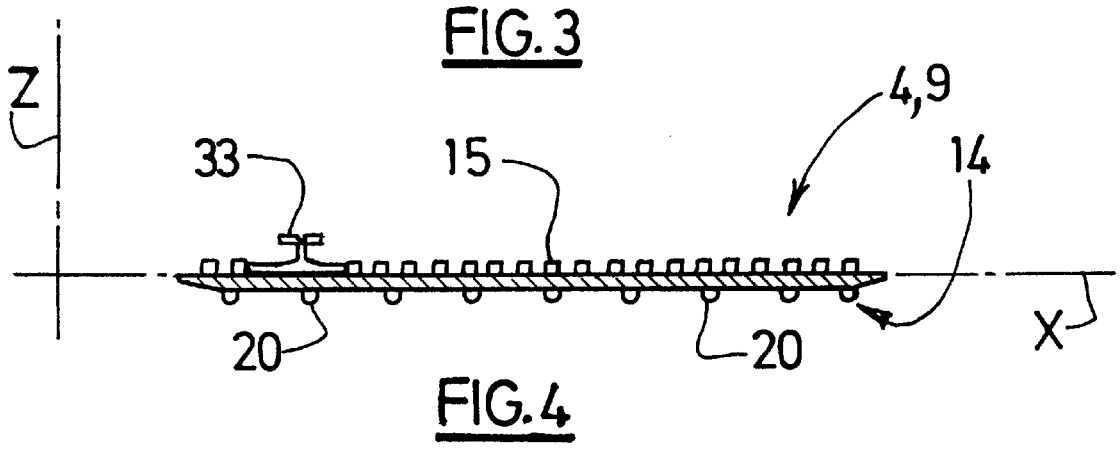
FIG. 4 is a schematic sectional view of the cargo loading assembly of FIG. 3, taken longitudinally along line IV., the unit load device latching elements being erected.

Another configuration, referred to as freight or cargo transport mode, is shown in FIGS. 2 to 4 in particular.

A third configuration, called moduler mode, is specifically illustrated in FIG. 18.

Generally speaking, for the transport of either passengers and/or freight on the passenger deck 5 of an aircraft 1, the passenger and/or freight accomodations/systems, are to be alternatively removed/installed (or vice versa) frequently.

The invention provides for those adequatelly sized units, so as to optimize the payload of the passenger and freighter role.

The invention also provides for a new mode, for transportation of one or a plurality of unit modules.

A first embodiment groups and combines passenger accomodation/systems, i.e. passenger seats 12 and/or installations with their provisions for attachement and its floor carpet, to be handled as one unit each.

This integrates the provisions for transport into and along the passenger deck 5 directly on the aircraft floor, with its guidance provided for correct positioning and restraint attachment.

Thus is allowed for a minimum thickness and weight of the base platform, colloquially called "seat-pallet 7", having a size, which is compatible to a chosen cargo pallet 9 size.

A second embodiment groups and combines cargo accomodation/systems, i.e. cargo loading system components for interface, unit load device-guidance/conveyance and restraints with their provisions for attachment and protective flooring (andislide-surface) and transport units to be handled as one unit each.

This integrates the provisions for transport into and along the (then) cargo compartment deck 5 directly on the aircraft floor (providing for a readable placarding) with its guidance provided for correct prositioning and restraint attachment.

This allows to remove/install the majority of these components with its base (platform), which could be colloquially be called "cargo loading assembly 9", having a size, which is compatible to a chosen cargo pallet size.

For this purpose, the system 4 generally combinates:
- static locking means 6 for locking at least one seat pallet 7, for a passenger transport configuration, the static locking means 6 being constantly flush in elevation (Z) with and rigidly secured to deck 5;
- static anchoring means 8 for anchoring at least one cargo loading assembly 9, for a freight transport configuration, these means 8 being constantly flush in elevation with and rigidly secured to the deck 5.
- Static securing means 47, for attachment of at least a module unit 49, for a modular mode, the static securing means 6 being constantly flush in elevation (Z) with and rigidly secured to the deck 5.

Figure 1:
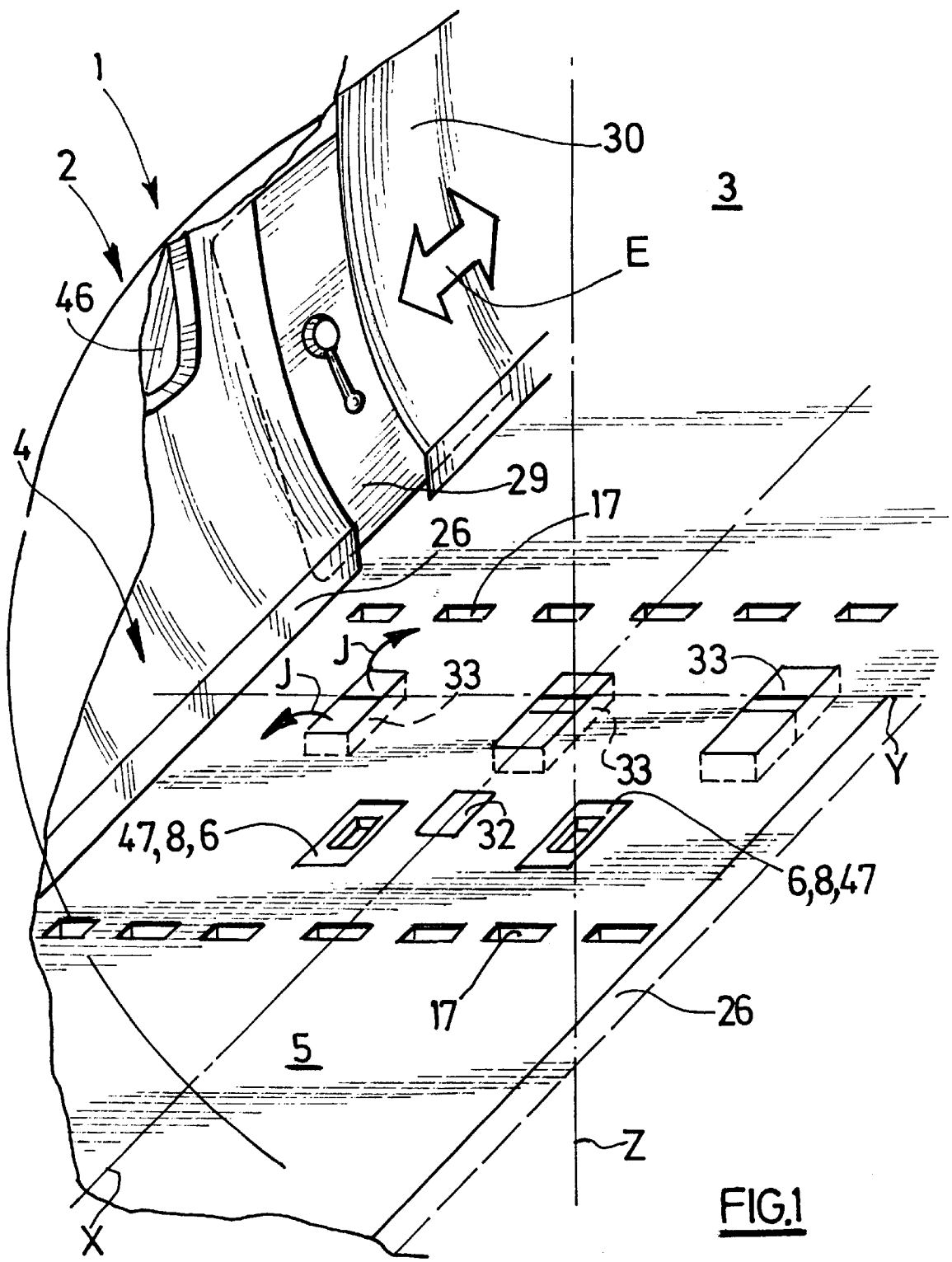
FIG. 1 is a schematic perspective view of the inside of a convertible aircraft cabin, without its freight and/or passengers and/or modular transport equipment, but with static means, retractable latching elements in the deck, and a mobile partition for masking and isolating the cabin from the freight loading side door.

The static anchoring means 8 are common with the floor board locking means 6 and static securing means 47 on FIG. 1.

Other figures show embodiments where means 6, 8 and 47 are at least partly distinct.

The static locking means 6 are respectively intended to be interlocked with movable locking means 21 attached to a seat pallet 7.

So-called displacement means 10 are attached on at least one seat pallet 7. In the figures, these displacement means 10 are attached to an under face of an underframe 11 of a seat 12.

On the underframe 11, a non-bearing floor pannel 13 is rigidly secured.

Similarly to means 6, the static anchoring means 8 are intended to be interlocked with movable anchoring elements of a cargo loading assembly 9.

Displacement means are also provided for cargo mode, respectively as lower displacement means 14 for transportation of the assembly 9 on the deck 5, and upper displacement means 15 of at least a unit load device 34 on a top loading surface of the assembly 9.

Such displacement means 14 and 15 are for instance retractable ball bearing elements, similarly to means 10.

The FIG. 14 shows a cargo loading assembly 9 equiped with low friction contact means 44.

Here, means 44 are ball bearing members mounted on a rigid bearing frame of the pallet 9, projecting laterally from the latter.

In the example of FIG. 14, the aircraft structure is equipped with static low friction contact members 27, in this case a roller element mounted on a bearing frame of the fuselage 2, under a inner lining of the cabin 3.

As shown, members 27 are generally disposed upright, i.e. with their rotation axis substantially paralell to direction Z, at each side of the cabin 3. These members act as longitudinal side guides.

On FIGS. 14 and 15 are shown movable low friction contact means 44, located on a cargo looading assembly 9, in the vicinity of a longitudinal guide 26. The means 44 are also generally disposed upright, i.e. with the rotation axis substantially parallel to direction Z.

Also from FIG. 14, it appears that the assembly 9 is suited for being guided by the elements 44, while the unit load device 34 is suited to be guided by the longitudinal guide 26.

This guide has the shape of a extendable/withdrawable stiff flap. The guide 26 is shown in a generally elevation Z upwards position (in shadow line), and (in plain line) in a withdrawn generally Y position.

The FIG. 1 shows that the system 4 includes at least one positioning cavity 17.

Each shown cavity 17 is a shallow groove, opening flush with the deck 5 and intended to temporarily position a cargo loading assembly 9 (or a seat pallet 7) in a predetermined location, within cabin 3.

This is obtained by engaging at least one of the displacement means 10 or 14 into the cavity 17.

In some embodiments, the displacement means 10, 14 and 15 are retractable and include elastic pushing means 19.

In the figures, the retractable displacement means 10, 14, 15 comprise each a spring acting as elastic pushing means 19, rigidly fixed to an underframe of a mobile structure of the system 4.

This structure is a seat pallet 7, an assembly 9, a module unit 49 or an unit load device 34, depending on the mode choosen for the aircraft 1.

On the other hand, the means or spring 19 is adapted to push a rolling member 20 rotatably guided in the underframe.

The spring is therefore pushed so as to generally protude from the underface of the unederframe, when not retracted. The corresponding pallet 7, assembly 9, module unit 49 or device 34 is generally pushed, due to this, at a distance from the top of the deck 5.

Most of the times, the rolling member 20 is a ball or a rolling bar.

In view of FIGS. 6a, 7 and 13, it appears that at least one seat pallet 7 has attached to, pulling down means 18, for conjuring away retractable the displacement means (10, 15) and laying down thecorresponding movable structure of the system 4, i.e. a pallet 7, against the deck 5.

In embodiments, the assembly 9, module unit 49 or device 34 are also equipped with such pulling down means 18.

Depending on the embodiment, such as in FIG. 13, the movable locking means 21 (or the movable anchoring means) are common with the pulling down means 18.

From the above figures, it is shown that at least one of the movable locking means include a control lever 22, a locking hook 21 mounted in a mobile fashion on the underframe 11.

The control lever 22 and the hook 21 are functionnally connected, in such a manner that when the lever 22 is moved in one direction (along the arrow D), the hook projects 21 beneath the underframe and interlocks with static locking means 6 housed within the deck 5.

In the other direction (along the arrow D), the hook 21 is retracted flush with the bottom of the underframe 11, at a distance from the top of the deck 5.

In FIG. 7, two hooks 21 are connected to one same control lever 22, by a rod, so as to be jointly displaceable. In fact, all the hooks 21 of the shown pallet 7 are connected to the same control lever 22.

Of course, any means providing a functional connection are possibly usable with the invention. Such means are for instance hinges, endless screw and bolt, saw gears and bolts, wires, fluid actuated pistons, electric motors, etc.

This vent panel is between frames of the fuselage 2, below window line, with the size and pressure relief opening cross-section and a plug type seal.

Are also provided flags, for every door closing hook, well visible frome outside when still open.

Pressure seals are mounted on inner and outer one circumferential, and encloses closing hooks/spool fittings.

Items for drainage are arranged between pressure seals with door open and for piano hinges over board.

A gutter is located above piano hinge, inclined to rear door shell "bump".

Depending on embodiments, vision is obtained into or outside with open windows shades. Optionnay for freighter is provided a window between frames plus special shade.

On FIGS. 15 and 16, the power is an hydraulic system with leakage collector and leakage indicator required.

Alternatively, an electric (ground bus bar) power is provided in embodiments.

Manual operation is as per hydraulic hand pump (reinforced) for cargo doors. Access to valve is set in aft cargo compartment door area.

A mechanism such as scissor drives, must not violate clear height when in position or unit load device 34 contour during deployment. Cable looms are therefore avoided.

FIGS. 15 and 16 feature an embodiment where the movable locking and/or anchoring means and/or the pulling down means 18 and/or the movable securing elements 48 comprise a power control 42 with pressurized fluid.

In this embodiment, all the movable locking and/or anchoring means and/or the pulling down means on the movable structures of the system 4 are functionally connected to one of the pressurized fluid source of the aircraft 1, via the power control 42.

They can therefore be actuated or be desactivated simultaneously, from a single control.

FIG. 5 shows a seat pallet 7 which is equipped with a stiffening bar 23, rigidly secured to a corresponding underframe, particularly so as to withstand load stresses applied to a floor panel 13.

Also on FIG. 5, is shown a movable overlapping flap 50 articulated to the seat pallet 7.

The flap 50 is articulated through a transverse Y axis, to the underframe 11, so as to overlap a neughbouring seat pallet 7 (or other movable structure of the system such as a module nuit 49). This flap comprises interlocking means to connect with this neughbouring seat pallet 7.

It appears from FIGS. 8 to 12 and 14 that embodiments provide for at least one of the static locking and/or anchoring means arranged on and rigidly secured to a floor structure beam 24, comprised in the supporting structure of the deck 5.

The beam 24 has a "C-opposed-C" or "tipped over H" shaped cross section.

Between the two opposed C-shaped parts of the beam 24, is rigidly secured a female piece 25. This piece 25 is a fitting in these embodiments. A pair of male pieces 45 are hold by the fitting 24, into a cavity thereof.

Each of the male piece 45 is here a transverse bolt.

The corresponding movable means of a seat pallet 7, a cargo loading assembly 9, a unit module 49 or a unit load device (container) 34, are of complementary shape to the cavity and bolts 45 in the fitting 25, so as to be latched therein when actuated.

According to one embodiment, the pulling down means 18 are of a similar structure to the means 21 shown in FIGS. 6a, 6a and 7.

In FIG. 15, the system 4 includes on each lateral side of the deck 5, at least two longitudinal guides 26 intended to enable the lateral guidance and positionning of e.g. the cargo loading assemblies 9, via each corresponding underframe, as illustrated.

Similarly, FIG. 16 shows that seat pallets 7 are located through guide 26 when the aircraft 1 is converted in PAX mode.

FIG. 1 shows a longitudinally mobile (as illustrated by arrow E) masking and isolating partition 30, mounted on the aircraft structure, parallel to the inner contour of the cabin 3.

The partition 30 is to be arranged between a loading door 29 of the aircraft 1 and the interior of the cabin 3.

In FIG. 2, the transversal separating barrier 28, is mounted in a removable manner, near a longitudinal fore end of a cargo loading assembly 9.

Such a transverse separating assembly 28, illustrated as a wall and generally called "net", is mounted in a removable manner, near a longitudinally end of a cargo loading assembly 9. This net 28 acts as a safety device, limiting forewards indesirable movements of unlatched pay-load in the cabin 3.

A feature provides for the floor pannel 13 to include at least one structure made of a composite material 31, for instance with an aluminium and glass fiber.

This is here a so-called fiber/metal laminate material, with sandwiched honeycomb and foil layers.

Though it is not illustrated, at least one seat pallet 7 may be equipped with one or more retractable stiffening feet, for instance a flat item mounted on an underframe 11 through a longitudinal hinge.

From FIG. 18, appears an embodiment of aircraft 1 in a modular mode. This figure is a transverse cross section part view of an aircraft 1 according to the invention.

The shown cabin 3 is in modular mode with the movable securing elements 48 and static securing means 47 interlocked or attached together.

In that interlocked state, the means 47 and 48 maintain a module unit 49 in a predetermined position on the main deck 5.

Such means and unit 49 are part of this embodiment of the system 4.

On the upper or top face of the cargo loading assemblies 9 of FIG. 12, are provided restraining or unit load device latching elements 33, adapted to position and latch a container 34 when charged into the cabin 3, as illustrated by the arrow F in FIG. 2.

When unlatched, the container can be unloaded easily, due limited friction obtained through displacement means 14.

From the forecoming, is understood the invention's method for quickly converting at least part of the main deck 5 of an aircraft 1 from one of at least two configurations to the other, and vice versa.

In FIGS. 3 and 4, unit load device latching elements 33 attached to the cargo loading assembly 9 are of a retractable type, adapted to be flush with both an upper and a lower level of the assembly 9 when in a retracted state.

FIG. 1 shows a unit load device latching elements 33 attached to the structure of the aircraft 1 and of a retractable type, as illustrated by the arrows J.

These elements 33 are adapted to be flush with an upper level of the deck when in a retracted state. When pivoted as per arrows J, they protude from the upper level of the deck 5, to be in actuated state.

According to another feature, the system 4 comprises at least a power drive mechanism 32.

These mechanisms 32 are adapted to provide for power assisted transportation of at least a unit load device 34.

On FIG. 2, the mechanism 32 is attached to a cargo loading assembly 9.

On FIG. 1, it is attache to the structure of the aircraft 1, for instance to a structure beam.

As for the elements 33, at least an unit load device a power drive mechanism 32 attached to a cargo loading assembly 9 is of a retractable type, adapted to be flush with both an upper and a lower level of the assembly 9 when in a retracted state.

Or at least a power drive mechanism 32 attached to the structure of the aircraft 1 is of a retractable type, adapted to be flush with an upper level of the deck 5 when in a retracted state.

As per seat pallets 7, at least a cargo loading assembly 9 comprises a surrounding underframe and attached to the latter, at least a longitudinal member holding upper displacement means for unit load device transportation and/or latching means for unit load device latching and/or power drive mechanism for power assisted unit load device transportation.

According to the method of the invention, when converting the aircraft 1 to cargo mode, at least a cargo loading assembly 9 is introduced and installed in the cabin 3.

And when the aircraft 1 is converted from cargo mode to PAX mode, at least one cargo loading assembly 9 therefore is unlatched and removed from the cabin 3.

In an example of the method, at least a part of the deck 5 is converted from PAX and/or cargo mode, to a modular mode, through a step of introducing in the cabin 3, upon his own lower displacement means, a modular unit 49.

Another example provides for that a plurality of seat pallet and/or cargo loading assembly and/or module unit are actuated/desactivated by use of a common control 42.

Another aspect of the invention is an aircraft 1 including at least one system and/or converted according to the method as explained above.

Such a method may include the step of deploying anchoring means 8 previously flush with the deck 5.

In FIG. 1, the convertible aircraft cabin 3 is shown without its freight or transport equipment and is equipped with a mobile, as indicated by arrow E, partition 30 for masking and isolating the freight loading side door 29.

FIG. 2 shows a cabin 3, in freight transport configuration, equipped with a transversal barrier 28 for separating the cabin 3 into various areas.

The elements 33 on the assembly 9, locks a device or container 34 suited for being loaded on or unloaded from assembly 9, as shown by arrow F.

The carpets 35 and 36 overlap when positioned, and they are equipped with mutual joining means 37, such as a quick bonding strip.

FIG. 8 shows a conventional floor beam 38, a seat rail section 39, a supporting board 40, a carpet 35 and a covering rigid plate 41.

FIG. 9 shows a beam 38, a reinforcing section of deck support 24, a rolling slide section for a freight transport configuration.

And FIG. 10 is a view similar to FIG. 9, showing a piece 25 arranged on a reinforcing section with a tipped over H shaped cross section, having a female locking part for a passenger transport configuration.

The possibility to realize those features, e.g. for a quick convertible air liner, involves that, logistically the additional "cargo loading assemblies" however allows for repairs at the base, and the cargo loading assemblies using 9 g containers and no net could balance the conversion effort.

The repercussions doing so for two applications are addressed at not used/retrofitted or new aircraft 1, as both need a "new", structurally reinforced floor.

Addressed is to keep the conventional seat rails in a quick convertible version possibly partially replaced with steel seat rail—heads as the most precise reference measure in the aircraft 1. But even with some turn double studs are possible.

It is also possible to insert double-bolt fittings locally into seatrail profiles alternatively between double U-profiles, replacing seat rails but using the lever/double hook fixation of the aircraft 1.

The advantages so achievable are clearly approximative 650 kg more payload in passenger mode of the quick change aircraft 1 and the dynamic simulation of the 9 g container can reduce the tare weight and forces to be sustained by the floor significantly, both raising the net-payload.

This is provided for retrofit delivered or certified production aircraft 1 to a new version.

As production aircraft 1, it may be a "green" aircraft. That is interior and systems not being part of the definition of the new version(s) are not installed.

Interior is part of the definition and may be already installed or be delivered as kit.

Accordingly, the requirements of the invention are to voluntarily exceed performance requirements and the state of the art.

The aircraft 1 according to the invention is to a large extent identical to the basic aircraft 1, both feature additionally:

- a large main deck cargo door 29 located e.g. rearward, left hand in cabin 3;
- a completely new main deck floor 5, required for the cargo loading assemblies 9 for adequate unit load devices 34.

Some embodiments require a forward Safety Barrier Net or "SFN" 28.

A example of prior art basic aircraft 1 is a stripped version, with most of the passenger amenities removed, most passenger doors deactivated, protective lining, drainage installed, a permanently installed cargo loading systems and provided for Main Deck cargo transport (fire extinguishing equipment).

To introduce invention versions of aircraft 1 in the market requires a major investment and return for both, the manufacturer and the customer.

Unequivoked customer acceptance provides the return of investment through quality with the invention.

The invention features are in this connection providing for:
- uncompromised main deck door function, safety and reliability;
- uncompromised passenger comfort and servicing;
- uncompromised ease of operation, safety and reliability of the system 4 for the seat conversion in daily operation, cargo loading conversion in daily operation, and permanent/removable cargo system safety barrier net 28;
- conversion time in about 40 mn, definition logistics concept;
- no damage of interior/conversion items during conversion; and
- minimum weight penalty consistent with sound design practice.

In line with the design requirements, there is a preference for convertible basic aircrafts 1, allowing for to design for the "convertible concept", that is for a removable, modular cargo system 4, providing for transport.

Thin no load bearing seat pallets 7, provides for transport and cargo unit load devices 34 without safety barrier 28.

Of course, combination with conventional load seat pallets on a permanent cargo system is however not excluded, justifying their utilisation and any drawbacks/advantages.

The cargo door 29 can be constructed with the example of geometry as follows, about:
- location between frames in the left hand, at the rear part of the fuselage 2;
- clear with 3600 mm in between inner pressure seal profiles, approximatelly;
- clear height 2200 mm in between main deck floor and maximum entrance height;
- entrance width 3300 mm in between foldable entrance guides forwards and aft;
- up to the entrance height 2000 mm, with in true clearance to clear height, for cargo loading assemblies 9.

For operation and safety, are generally provided:
- a main deck door outside, between frames of fuselage 2 below window line, water tight;
- a manual safety located outside, between frames, below window line, water tight, with lever/panel located inside, behind interior lining or for waiting/maintenance only.

The safety lever turns the safety rod, which blocks the door closing hooks and thus closes the vent-panel linked, last.

Also, floor lights may be provided and shall illuminate ground equipment, such as pallets 7 or assemblies 9 or units 49, such to allow to read their labels. They are activable once the door is adequately open only.

Air condition requires adequate solution in door area.

The torsion box of the door frame shell requires re-routing of some aircraft equipment in this area, as well as in the door sill area.

In PAX mode, comfort should retain all windows 46 of the standard aircraft 1 for the quick change version.

The seat pallets 7 are arranged no to violate shoulder-and head space of the passengers, check passenger layouts, not to create cold-bridges via door frame/door, and design for a passenger interior, which does not show the deck door 29 from inside. The pannel 30 aims at this.

The passenger comfort may require to remove interior lining and hatracks in the door 29 area. In this case a protective lining for the door and adjacent areas may be provided, being permanently installed, behind linings.

Also, stowage of parts must be provided at the seat pallet in the door area.

As explained, the deck compartment is this part of the deck cabin.

It provides for, such as with conventionally quick change systems, some conjured cargo system, allowing for the restraint of:
- self transport cargo system units, which provide for the transport of adequate air cargo containers for freighter opertion, or
- self transport seat pallets with seats and carpet.

Therefore, the aircraft according to the invention comprises, on the deck 5, only static locking and/or static anchoring and/or static securing means, which are, in at least a retracted state, flush with the deck 5.

As concerns common floor/interior repercussions, in conventional quick change-systems, the height of, and the distance between the guide/latchline to the "dado" panels has repercussions.

With a quick change-system 4 of the invention, a common guide line for the self transport seat pallet/cargo system units is provided close to, or in the recess of the "dado" panels, which ever has the more favourable repercussions, if so designed.

The cargo conversion according to the invention is further explained now.

The cargo loading assemblies 9 provide most features for conveyance and guidance, transport and restraint, for compatible unit load device 34 in aircraft cargo compartments.

In combination with a safety barrier net 28, it is easy to protect occupants against direct injury due to shifting of individual loads.

In "conventional cargo loading systems" which may remain installed in the aircraft, although components are removable, they are not being designed for frequent and quick removal/conversion.

The system 4 of the invention is one which is partly installed for the freighter, modular operations and partly removed for the PAX mode.

Below the seat pallets 7 it is not designed such, to group the features for conveyance and guidance, transport and restraint of compatible unit load device 34 in self-contained units.

The latter provide for transport and locking in their positions, allowing for frequent installation/removal within the quick conversion time allocated; and being part of the logistic concept thus, not to cause additional conversion times.

In some embodiments, cargo loading assemblies 9 can be designed to allow when removed, the utilization of "conventional" seat pallets.

The latter provide for transport and locking for passenger operation, or, accommodating compatible unit load devices 34 for freighter operation.

Although a reasonable carry over, if in existence, it had to be simplified for the self transport and locking features and could be simply "bolted" to floor profiles.

In general, the classic cargo loading system uses identical components except for those to sustain the emergency loads in addition to the flightloads—which these systems have to sustain.

This concerns only a few components, example given:

XZ latches whistand a substantial higher load, however to be seen with respect to restricted cargo equipment malfunction limitations; and being apt to impact loads from manual transport speeds;

continuous side guides to avoid impact to side latches; for the classic system bridging side latches at adjacent unit load device positions such, to provide a better load distribution;

continuous rollertracks as required for stiffening the floor for the classic system and improved conveyance/ transport friction factors.

In the system 4 may be provided conveyance means, also called "loading bridge", located in the main deck door sill, between entrance guides.

The function of the "loading bridge" is to provide for a deck loader platform distance of about 305 mm; and transfer unit load device's from the Main Deck loader to the main deck door area.

It also provides either rollers or solid unsprung ball units for conveyance which may have a preference, to manipulate unit load device's in the limited space there.

When folded up, it shall be stowed and secured between the closed deck door and the contour of the unit load device in the deck door area.

Another function is folding up or lowering possible by one man on the deck loader to be done with the loader positioned for deck door opening/closing.

It shall allow for above conditions for a maximum positive slope of 2° when hooked from top of the deck loader platform, preventing chafing for eigher or the adjacent conveyor surfaces, to assure a smooth transition in/out of the aircraft 1.

Besides, entrance guide is provided in an embodiment.

It functions to provide protection for the deck door frame, to take the impact loads from misaligned unit load device's and align them.

In this embodiment, a "ball unit" or "ballmat" is located in door area between side guides.

It functions to provide bi-drectional conveyance for unit load device's accomodated, with sprung hollow ball units, which when overloaded, crush but do not split, and transmitt forces via a rigid housing to the bottom of the ballmat-structure, and have a metal closing plate for its fixation on top.

The pattern of these ball units shall be staggered with a maximum distance in one row of about 130 mm, except for those areas, where a closer distance is a function of the unit load device entering impact.

The ball units shall, when loaded with a maximum gross weight unit load device be at the 2 in cargo loading sstem height.

The distance to the upper surface of the ballmat shall be such to prevent chafting of servicable unit load devices being bent to a certain extent.

The surface of the ballmat shall have an abrasive coating/ paint to withstand the weight and thread of handling personal and facilitate manual pushing of maximum gross-weight unit load device's.

The ballmat structure shall be easily repairable when damaged, and have a defined service life.

Accumulation of dirt, foreign objects, water is to be prevented at interfaces.

In some embodiments only, self transport shall be provided if for these particular units in the main deck 5 cargo compartment door area are utilized, with inverted ball units, spring loaded to carry only the weight of these units, and to become flush with the lower ballmat, when installed and attached.

Some roller tracks are shown on FIGS. 9, 14 and 15.

Such tracks are located on the cargo compartment floor, above its length of unit load device positions provided, except for the ballmat area, if so designed.

The dimensions are a function of the additional stiffness they can provide and transport roller width installed.

When using an extrusion profiles 43, their form shall be such to not require bushing for transport roller axles as well as the stiffness required not to bend under its loads and the weight and thread of handling personnel.

These tracks function to transport roller diameter, bearings, length and shape, e.g. crowned, together with distances and staggering provide for minimum friction, that is enable enable easiest manual pushing of containers as defined for their interface at for instance 400 kg maximum grossweight, taking into account the interface elasticities.

The guidance is understood as acting horizontally, to eigher act laterally of longitudinally. It provides for alignement, positioning of units, for clearances specified, for fixation or trestraint.

The guidance is also understood as acting vertically, to eigher act laterally or longitudinally. It provides for the reference plane of units for vertical clearances specified for restraint.

Both are provided to prevent impact of moving units and gliding friction, either employing rollers in adequate height/ distances or low friction surfaces, if equivalent.

Some cargo loading assemblies 9 components provide with guidance function elements, as per FIG. 14:

alignment entrance guides, lateral, in ballmat area, with vertical rollers;

XZ latches to slot las unit load device, lateral, in ballmat area, with vertical rollers foreward and aft of latchface which could see impact;

alignement in left hand door area and longitudinal side guides, with vertical rollers;

side latches YZ, on both sides of vertical inboard latchface, with vertical rollers if not provided through side guides;

side latches YZ, on horizontal conveyance plane, on both sides of the horizontal part below the unit load device with horizontal rollers to support outboard unit load device profil if this support is not already provided per roller track;

centre latches YZ on both sides, foldable or overridable with vertical and horizontal rollers as for side latches YZ and if so designed horizontal rollers for Z nose on both sides.

The spacing and height/roller diameter is a function of the unit load device corner form specified and unit load device parallel dimensions, as well as clearances provided by the cargo loading assemblies 9 installation.

The number of such rollers may be minimized as far as not leading to gliding friction.

The roller tracks may have a self aligning function via lateral spring loaded side-play to both sides out of a central position.

The manual transport of unit load devices 34 at maximum gross weight is now cosidered. Current experience tells, that unit load device's are difficult to transport, therefore the objective is to lower friction.

Current experience sees specified unit load device speeds of 1 m/s maximum speeds or of 1.6 m/s causes impact to XZ latches.

It would be advisable to limit such speeds longitudinally to a top speed of e.g. 0.62 m/s per braking rolers if available, likely achievable with a hydraulic brake roller only.

In the case where lateral movement and backlash may cause lateral movement of the fuselage 2, however a power assisted transport of unit load devices 34 at maximum gross weight may be provided.

It may be required in the door area, to initiate unit load device movement because of space being restricted and loading personnel damaging interior of compartment.

Therefore lateral and longitudinal power drive units shall be installed in the central ballmat area such to form one sub component of the ballmat with one single power and control supply plug.

These units are to be self-raising and sensor controlled, to raise only under a unit load device. The control of thse shall be part of the Main Deck door panel.

Those units shall provide for, but also brake to a speed of 0.25 m/s laterally as well as longitudinally, if above brake rollers are not feasible/available.

In embodiments, different restraint means are provided.

So-called lateral YZ restraints are located for the latchline in width on both sides and fuselage 2 frame-stations.

So-called lateral lefthand overridable YZ restraints are in the door area.

These are overridable from ouside and selfraising and provide for longitudinal guidance with vertical rollers.

They serve also as rollback (rollout safety), if not separatly covered. These latches can be stepped and locked down for un-loading.

So-called fixed YZ restraints are installed along the fuselage 2 and feature siderollers foreward and aft of latch face as required, and serve to house the continuous side guides.

At those places where unit load device 34 positions end or begin, the side guides are designed to bridge the sidelatches to distribute the forces from the moment of an unit load device 34 to both sidelatches as required.

So-called end stops XZ fixed retrains are installed on both ends of the unit load device arrangement in each of the roller track lines foreward and aft.

So-called position XZ restraints are XZ latches, which are to be raised and secured manually, may be lowered by foot for both, security- and latch-pawls. They are installed in each roller track line, for each unit load device position.

The security is to prevent, that with partial loading, as far as permissible, packages penetrating the rear net could unlatch them beyond allowances of the cargo equipment malfunction limitations causing inadverted movement/forces and thus impact.

According to the invention, the components of cargo loading assemblies 9 as required for conveyance, transport, guidance and restraint are grouped together, in a size of about a unit load device 34 baseplate.

But not necessarily at the corresponding unit load device position, providing as required selftransport per inverted sprung ball elements.

These ball elements are generaly arranged such:
- to contact as selected area when loaded/unloaded in the door area, to ensure smooth movement also in the logistic van;
- to be spaced such, when loaded longitudinally, to bridge interruptions (hard point fittings) along the roller track line; and
- may find a counter part/sunk at position for a rather precise prepositioning before fixing the restraint elements.

Once the cargo system group is in position with the help of auxiliary side guides/the seat pallet side guides, all side latches and endstops/position latches are engaged to their hard points, sunk along seat profiles in the floor.

The cargo system group may include a partiel/full floorplate which serves as walk and unit load device push way with corrigated/abrasion paint surface or rubber surface.

Thus the floor shear pannels 13 or plates within the constraints of weight versus protection/functionality achieved.

The hard points in the seat profiles can be, but are not necessarily different for every cargo loading assemblies 9 for industrial reasons and with respect to impact loads/manual handling speeds or higher position allowed for a freight version.

In some embodiment, least one XZ latch line may have to be accomodated in the usual seat rail head, likely to be from steel for this case, but possibly this area has to accomodate only a modified hardpoint as proposed.

A safety barrier net, may be provided to sustain emergency loads of the cummulated unit load device loads in Main Deck compartment, which could be the maximum payload of the aircraft 1, that is e.g. 25 t.

The safety barrier ultimate load becomes then 225 t, but has also to account for the load combinations.

In a version, a safety barrier net is attached to a significantly reinforced frames with loops to break loose to find a shape which transmits the majority of its forces tangentially/longitudinally in the fuselage 2 at its fixation points.

Those in the floor being linked to seat rail profiles which deform tangentially and get the longitudinal forces via shear webs into the fuselage 2.

Another version of a safety barrier net without break loose loops toward its frame/floor attachements, transfers its longitudinal loads tangentially (e.g. stainless steel bands) to shearpanels/stingers/skin further backwards in the fuselage 2, those in the floor as above.

As concerns the unit load devices 34, it is aming to define an optimized interface for quick change and foreight cargo systems, as resulting from loads.

Some quick change unit load device's are containers only, unidirectional covered base with adequate contours.

Some freight unit load device's are pallet plus nets and containers, multidirectional covered base with adequate contours.

With PAX conversion, are generally provided compartment interior arrangements.

For instance, is provided an interior ceiling, hatracks, sidelining, insulation, protective lining.

As combined with a suitable adaptation, it provides for a clear height with a flat ceiling-adequate lighting to make this optically agreable.

With respect to the very small torsion box, housing hydraulic jacks, the flood lights requirement is to achieve minimum damage during loading-may have to be installed in the main deck compartment door itself.

Thus, it may be preferable to remove main deck compartment door hatracks and side lining for freighter operation—being stowed at the first seat pallet as sizewise suitable—as done in the aircraft 1.

This requires there a permanent door plus part door frame protective lining.

The conventional system to open the main deck compartment door with hatracks and side lining installed, is an alternative solution.

As concerns seat pallets 7, both, the conventional seat pallet with its structural members for forward seat 12 leg attachments and a rear seat leg floor fitting, and the invention seat pallet 7 attaching all seat legs to floor fittings, have to cater for 16 g seats.

Both are sizewise an individual adaptation to PAX layouts and the logistic system.

But, moreover it has to allow for handling within the conversion time allocated.

In comparison with seat pallets 7, standard provides for the weight penalty to be assessed as well as maintenance for its required stiff design to bridge rollertrack distances for the weight and thread of PAX. Trolleys carried plus ramps are required.

According to the invention, the "seat pallet" part is reduced to its basic functions: a device to group seats 12, carry a carpet.

When installed, supported directly by the compartment floor, it is ready to accept the weight and thread of pax and trolleys.

A similar concept is as far as possible applied to cargo loading assemblies 9.

The weight advantage is to be assessed as well as maintenance, stiffness being required to match those of the floorplates in combination, and this one required for transport during conversion.

If so required, cut-outs may provide for the installation of 16 g attendant seats 12.

The seat pallet is assumed to have a hight (thickness) of maximum 4 mm without carpet, except for guidance profiles and carpet-retainer/close up foreward plus aft profiles.

Of course, standard seats 12 can be used, except for its leg end structure which is to be specified such to provide for foreward plus aft seat leg attachement fittings The standart aircraft 1 conversion is specified to be performed in minimum 40 mn. Any other turnround activity may be performed in parallel, except passenger deplaning, when converting to freighter-operation; or passenger enplaning, when converting to passenger-operation.

With the invention a quick change conversion time study shows that the time the main deck compartment door is not closed is 30 mn, approximativelly.

The study whows the example of converting to freighter operation. It includes main deck compartment door opening, positioning logistics van, seat pallet removal/cargoloading system installation, logistics van removal, loader positioning and dolly train arrival, loading of unit load device's loader removal and main deck compartment door closing.

As concerns conversion logistics concepts mainly the logistics vans and the space required to accomodate all conversion items, taht is seat pallets 7 and it purpose of the invention that logistic vans are included.

It shall be the choice of the operator whether the preference in his operating environment results in the choice of single deck vans with extender platform, or in the choice of two double deck van, considerably higher and featuring not only extender platforms, but also lift capabilities, requiring more wind stability and a heavier chassis. For some operators, other criteria as e.g. men power, cleaning, maintenance, side access for the concept variation are to be adopted with subsequent interface requirements for an optimized conversion operation.

The quick change conversion logistics concept is of prime-importance for a problem free, easy to use, causing no damage, allowing for cleaning and maintenance outside the aircraft—and allowing to meet conversion times—overall system of which the conversion logistics vans are only a prominent part of.

What is claimed is:

1. A system for quickly and repetitively converting at least part of a main deck of an aircraft, from one of at least two configurations to another, the system including in combination:

at least a part of a main deck of an aircraft;

at least one seat pallet and at least one cargo loading assembly, each seat pallet and cargo loading assembly having lower displacement means for transporting said seat pallet and said cargo loading assembly on the deck;

static locking means secured to the deck for locking at least one seat pallet to the deck in a passenger transport configuration PAX;

static anchoring means rigidly secured to the deck for anchoring at least one cargo loading assembly to the deck in a freight transport configuration, characterized in that: the static locking means are rigidly secured to, and constantly flush with, the deck, and wherein an interlock with a moveable locking element is attached to the seat pallet;

the static anchoring means are at least partly common with the static locking means, and are rigidly secured to, and flush with, the deck and interlock with moveable anchoring elements of the cargo loading assembly;

the lower displacement means of the seat pallet are retractable displacement means attached on at least one seat underframe of the seat pallet on which a non-bearing floor panel is rigidly secured, the lower displacement means attached to the cargo loading assembly being retractable displacement means in the form of a retractable ball bearing, the loading cargo assembly further comprising upper displacement means, attached to the assembly by retractable ball bearing elements, attached to the assembly for transporting at least one unit load device on a top surface of the assembly;

the system further including at least a unit module having retractable displacement means in the form of a retractable ball bearing attached to the module unit for transporting it on the deck; and static securing means for anchoring the at least one unit module to the deck in a modular transport configuration, said static securing means being at least partly common with the static locking and anchoring means, the static securing means having moveable securing elements and being rigidly secured to, and flush with, the deck of interlocking, with said moveable securing elements, the at least one unit module.

2. System according to claim 1, which comprises at least one seat pallet and/or cargo loading assembly and/or module unit is equipped with at least one longitudinal and/or lateral guide comprising low friction contact means, for instance spring loaded ball bearing members mounted on an underframe of the pallet, assembly or unit and projecting from the latter.

3. System according to claim 1, wherein on each lateral side of the cabin, at least two longitudinal guides rigidly attached to the aircraft and intended to enable the lateral guidance and positioning of at least one seat pallet and/or cargo loading assembly and/or module unit, via an underframe.

4. System according to claim 1, which includes at least one positioning cavity, such as a shallow groove, opening flush with the deck and intended to position a cargo loading assembly and/or a seat pallet and/or module unit in a predetermined location, by engaging at least one of the displacement means into the cavity.

5. System according to claim 1, wherein at least one of the static locking and/or static anchoring and/or static securing means is arranged in and rigidly secured to a floor structure beam.

6. System according to claim 1, wherein at least one of the static locking and/or static anchoring and/or static securing means includes a female piece secured to a floor structure beam and at least a male piece held by this female piece, both being of complementary shape to the corresponding movable locking and/or anchoring and/or securing elements, for instance at least a "C-opposed-C" shaped cross section floor structure beam has attached to a female fitting of generally "W" shaped cross section, holding two transverse parallel male bolts.

7. System according to claim 1, wherein a mobile generally longitudinally oriented masking and isolating partition is mounted on the aircraft structure, parallel to the inner contour of the cabin, such that it may be arranged between a loading door of the aircraft and the interior of its cabin.

8. System according to claim 1, wherein a transverse barrier assembly is mounted in a removable manner, near a longitudinal end of a seat pallet and/or a cargo loading assembly and/or unit module, generally at a forward end.

9. System according to claim 1, wherein the displacement means are retractable and include each a spring rigidly fixed to the pallet, assembly or unit on the one hand, on the other hand the spring being adapted to push a rolling member, the latter being rotatably guided in the pallet, assembly or unit so as to generally protrude from the underface of an underframe of the pallet, assembly or unit, for instance the member is a ball.

10. System according to claim 1, wherein at least one module unit is comprised of a rigid underframe and upon the latter, a utility volume at least partly closed by one or a plurality of walls, generally extending from an upper face of the underframe.

11. System according to claim 1, wherein at least seat pallet and/or cargo loading assembly and/or unit module is attached to pulling down means, for conjuring away displacement means of a retractable type and laying down the seat pallet and/or cargo loading assembly and/or unit module against the deck.

12. System according to claim 11, wherein at least one of the movable locking means and/or the movable anchoring and/or movable securing means is, at least partly, common with the pulling down means.

13. System according to claim 1, wherein at least one of the movable locking and/or the movable anchoring and/or movable securing and/or pulling down means includes at least one control lever, a hook mounted in a mobile fashion on an underframe of a seat pallet, cargo loading assembly or module unit, for instance the control lever and the hook are connected, e.g. by a hinge in such a manner that when the lever is moved in one direction, the hook projects beneath the pallet, assembly or unit and interlocks with static locking and/or anchoring and/or securing means, whereas in the other direction, the hook is retracted flush with the bottom of the pallet, assembly or unit, at a distance from the top of the deck.

14. System according to claim 1, wherein at least two of the movable locking and/or the movable anchoring and/or movable securing and/or pulling down means are connected to a common control so as to be jointly activated/deactivated, for instance, all the hooks in a seat pallet and/or cargo loading assembly and/or unit module are connected to the same control lever.

15. System according to claim 1, wherein at least one of the movable locking and/or movable anchoring and/or movable securing and/or pulling down means comprises a power control, for instance, all the movable locking and/or anchoring means and/or movable securing and/or pulling down means disposed on a deck are functionally connected to a pressurized fluid source in the aircraft, via the power control.

16. System according to claim 1, wherein at least one seat pallet and/or cargo loading assembly and/or unit module is equipped with at least one stiffening bar, articulated to a corresponding underframe, so as to overlap at least a neighboring seat pallet and/or cargo loading assembly and/or module unit, for instance a stiffening flap comprises means for interlocking a neighboring pallet and/or assembly and/or unit.

17. System according to claim 1, wherein at least one of the seat pallet and/or cargo loading assembly and/or module unit includes a structure made of a composite material, for instance a honey comb and/or sandwiched lightweight high resistance material, such as fiber/laminate material.

18. System according to claim 1, comprising at least a latching element adapted to lock in a predetermined position at least a unit load device, attached to a cargo loading assembly and/or to the structure of the aircraft.

19. System according to claim 18, comprising at least a unit load device latching element attached to a cargo loading assembly of a retractable type, adapted to be flush with both an upper and a lower level of the assembly when in a retracted state, and/or at least a unit load device latching element attached to the structure of the aircraft of a retractable type, adapted to be flush with an upper level of the deck when in a retracted state.

20. System according to claim 1, comprising at least a power drive mechanism adapted to provide for power assisted transportation of at least a unit load device, attached to a cargo loading assembly and/or to the structure of the aircraft.

21. System according to claim 1, wherein, in at least a unit load device, a power drive mechanism is attached to a cargo loading assembly of a retractable type, adapted to be flush with both an upper and a lower level of the assembly when in a retracted state, and/or at least a power drive mechanism attached to the structure of the aircraft is of a retractable type, adapted to be flush with an upper level of the deck when in a retracted state.

22. System according to claim 1, wherein at least a cargo loading assembly comprises a surrounding underframe and attached to the latter, at least a longitudinal member holding upper displacement means for unit load device transportation and/or latching means for unit load device latching and/or power drive mechanisms for power assisted unit load device transportation.

23. Method for quickly and repeatedly converting at least part of a passenger cabin of an aircraft from one of at least two configurations to the other, and vice versa, with a system according to claim 1, characterized in that, when converting the aircraft to cargo mode, at least a cargo loading assembly is introduced and installed in the cabin, and when the aircraft is converted from cargo mode to PAX mode, at least one cargo loading assembly is unlatched and removed from the cabin.

24. Method according to claim 23, wherein at least a part of the deck is converted from PAX and/or cargo mode, to a modular mode, through a step of introducing in the cabin, upon lower displacement means, a module unit.

25. Method according to claim 1, wherein a plurality of seat pallet and/or cargo loading assembly and/or module unit are activated/deactivated by use of a common control.

26. Aircraft including at least one system according to claim 1, characterized in that at least one of the static locking means and/or static anchoring means and/or static securing are, in at least a retracted state.

* * * * *

UNITED STATES PATENT AND TRADEMARK OFFICE
CERTIFICATE OF CORRECTION

PATENT NO.     : 6,302,358 B1
DATED          : October 16, 2001
INVENTOR(S)    : Peter Emsters and Torsten Eilts It is certified that error appears in the above-identified patent and that said Letters Patent is hereby corrected as shown below:

<u>Title page,</u>
Item [73], Assignee, delete "Societe Industrielle et Commerciale de Materiel Aeronautique (FR)" and insert therefor -- AIRBUS INDUSTRIE (FR) --

Signed and Sealed this

Twentieth Day of May, 2003

JAMES E. ROGAN
*Director of the United States Patent and Trademark Office*